(12) United States Patent
Narula et al.

(10) Patent No.: US 12,549,344 B2
(45) Date of Patent: Feb. 10, 2026

(54) SYSTEM AND METHOD OF A COLLISION FREE SECURE WORKSPACE SETUP OF A GROUP OF PERIPHERAL DEVICES WITH A HOST INFORMATION HANDLING SYSTEM

(71) Applicant: Dell Products LP, Round Rock, TX (US)

(72) Inventors: Harpreet S. Narula, Austin, TX (US); Kai Leong Wong, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 127 days.

(21) Appl. No.: 18/643,518

(22) Filed: Apr. 23, 2024

(65) Prior Publication Data

US 2025/0330307 A1    Oct. 23, 2025

(51) Int. Cl.
| | |
|---|---|
| *H04L 9/08* | (2006.01) |
| *H04L 9/06* | (2006.01) |
| *H04L 9/40* | (2022.01) |
| *H04W 12/06* | (2021.01) |

(52) U.S. Cl.
CPC .......... *H04L 9/0861* (2013.01); *H04L 9/0643* (2013.01); *H04L 9/40* (2022.05); *H04L 63/0807* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,161,201 B2 * | 4/2012 | Anson | G06F 9/4411 710/36 |
| 10,627,882 B2 * | 4/2020 | Swierk | H04L 67/12 |
| 10,939,289 B1 * | 3/2021 | Krishnakumar | H04W 76/15 |
| 10,996,767 B2 * | 5/2021 | Iyer | G06F 3/0208 |
| 11,522,883 B2 * | 12/2022 | Dhoble | H04L 63/1433 |

(Continued)

FOREIGN PATENT DOCUMENTS

| | | | | |
|---|---|---|---|---|
| CN | 107479686 A | * | 12/2017 | G06F 3/017 |
| CN | 104396334 B | * | 6/2018 | H04W 72/23 |

(Continued)

*Primary Examiner* — Ali H. Cheema
(74) *Attorney, Agent, or Firm* — Prol Intellectual Property Law, PLLC; H. Kenneth Prol

(57) ABSTRACT

A peripheral device operatively couplable to an information handling system includes a microcontroller, a storage device, a wireless radio, and a power management unit (PMU) to provide power to the hardware microcontroller, storage device, and wireless radio. The hardware microcontroller executes computer-readable program code of a wireless pairing anti-collision module to determine that a group ID pairing beacon from one of a plurality of competing pairing peripheral devices is not being broadcasted. When no group ID pairing beacon is detected, the hardware microcontroller initiates a pairing process with the information handling system and generates a passcode list for pairing via a hash loop algorithm. The hardware microcontroller transmits to each competing pairing peripheral device an indication that the peripheral device is operating as a gateway peripheral device that controls the timing of the pairing of each of the plurality of competing pairing peripheral devices to the information handling system.

18 Claims, 6 Drawing Sheets

(56) References Cited

U.S. PATENT DOCUMENTS

| | | | |
|---|---|---|---|
| 11,576,100 B2 | 2/2023 | Choi | |
| 11,737,023 B2 * | 8/2023 | Narula | H04W 4/80 455/572 |
| 2002/0147816 A1 | 10/2002 | Hlasny | |
| 2006/0129679 A1 | 6/2006 | Hlasny | |
| 2014/0219193 A1 | 8/2014 | Linde | |
| 2018/0007499 A1 | 1/2018 | Lee | |
| 2018/0069726 A1 | 3/2018 | Ohhira | |
| 2019/0384405 A1 * | 12/2019 | Iyer | G06V 40/113 |
| 2019/0384406 A1 * | 12/2019 | Smith | G06V 40/113 |
| 2019/0384407 A1 * | 12/2019 | Smith | G06V 40/11 |
| 2020/0019763 A1 * | 1/2020 | Iyer | G06F 18/22 |
| 2020/0344608 A1 | 10/2020 | Duo | |
| 2021/0076163 A1 | 3/2021 | Burowski | |
| 2021/0227391 A1 | 7/2021 | Duo | |
| 2021/0337360 A1 | 10/2021 | Burowski | |
| 2022/0210735 A1 | 6/2022 | Narula | |
| 2023/0362645 A1 | 11/2023 | Duo | |

FOREIGN PATENT DOCUMENTS

| | | | | |
|---|---|---|---|---|
| CN | 114765767 B | * | 6/2025 | H04W 76/15 |
| EP | 1344339 A1 | | 9/2003 | |
| EP | 1344339 B1 | | 5/2015 | |
| KR | 20150073827 A | * | 7/2015 | H04W 12/06 |

\* cited by examiner

SYSTEM AND METHOD OF A COLLISION FREE SECURE WORKSPACE SETUP OF A GROUP OF PERIPHERAL DEVICES WITH A HOST INFORMATION HANDLING SYSTEM

FIELD OF THE DISCLOSURE

The present disclosure generally relates to a system to operatively couple a plurality of peripheral devices to an information handling system. The present disclosure more specifically relates to a system and method to operatively couple a group of peripheral devices to an information handling system without pairing collisions.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications, or gaming applications or the like. Further, the information handling system may include a radio to operatively couple or pair one or more peripheral devices to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
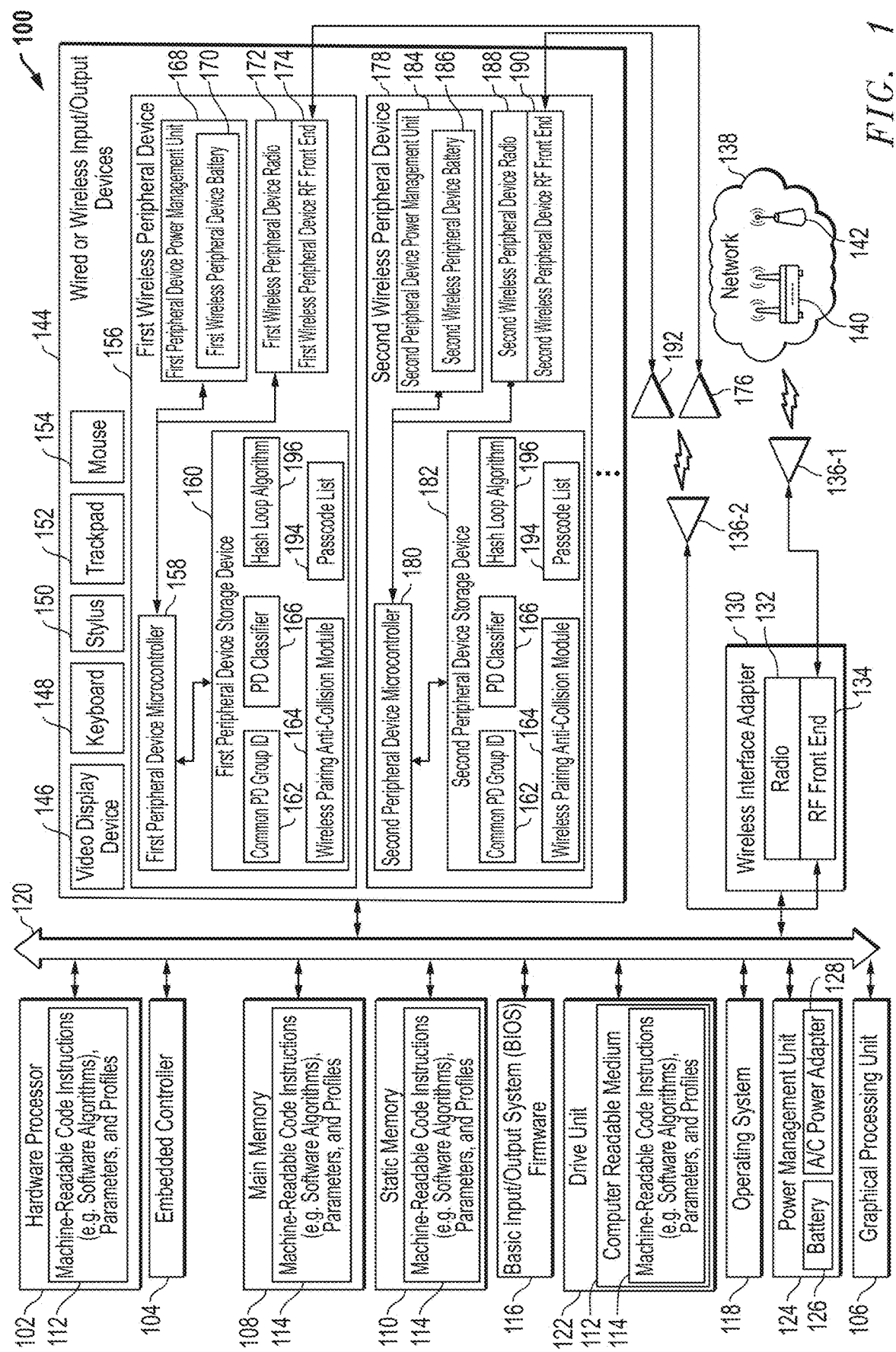
FIG. 1 is a block diagram illustrating an information handling system that may be operatively coupled to a first peripheral device and second peripheral device among a group of peripheral devices with one of the first and second peripheral devices acting as a gateway peripheral device for pairing according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a peripheral device that allows the user to interact with the information handling system. These peripheral devices may include a mouse, a keyboard, a video display device, a stylus, a trackpad, and the like that allows a user to provide input to the information handling system and receive output from the information handling system. These peripheral devices may be wirelessly couplable to the information handling system through the use of various radio frequency (RF) radios in the information handling system and the peripheral device. This operative coupling may include pairing the peripheral device to the information handling system, for example under Bluetooth® or Bluetooth® Low Energy (BLE) standards of wireless communications. Current pairing processes may include initiation or turning on the information handling system and peripheral device and initiating an initial communication such that confirming pairing data may be exchanged between the peripheral device and information handling system. One current pairing process includes a user to confirm a pin or other alphanumeric code on a display device of, for example, the information handling system to achieve a security standard level for the pairing. However, without the ability to input this code, this pairing process using a displayed alphanumeric code would not work. This occurs in "headless peripheral devices" that do not include these input capabilities or have other input capabilities that do not allow for input of the alphanumeric. In order to overcome this, these headless peripheral devices may be hard coded or include in a data storage device the alphanumeric code that is exchanged automatically between the peripheral device and the information handling system. Similarly, with smart devices that include, for example, its own hardware processing device such as a microcontroller, a random number generator may be provided to generate this alphanumeric code or other code that is exchanged between the peripheral device and the information handling system. However, this process only works for peripheral devices that have input capabilities that allow for this input.

Additionally, when a number of peripheral devices are turned on concurrently such as when a user enters an office or a room, collisions may occur where each individual peripheral device attempts to pair with the information handling system in a relatively short timeframe. This may occur where a user has purchased the information handling system along with a plurality of peripheral devices on, for example, an online website, has received the information handling system and peripheral devices and has attempted to initiate or turn on each of the peripheral devices concurrently.

The present specification describes a collision-free and secure pairing system and method a group of peripheral devices to an information handling system to reduce collisions upon pairing and simplifying requirements of entering pin codes or other pairing authorization codes among the group of peripheral devices. In an embodiment, the each of the plurality of peripheral devices may execute computer-readable program code of a wireless pairing anti-collision module to determine, after a period of time, that a group identification (ID) pairing beacon is or is not detected as broadcast from other peripheral device in the group. Focusing on a single or first peripheral device, where the first peripheral device has not detected this group ID pairing beacon, the first peripheral device may initiate pairing processes with the information handling system first and assume a role as a gateway peripheral device to orchestrate pairing of other peripheral devices within the group of peripheral devices. During this pairing process, in an embodiment, the hardware processing device (e.g., microcontroller) of the first peripheral device may generate a passcode list via execution of a hash loop algorithm. This passcode list may be used to not only pair the first peripheral device to the information handling system but is also used by the first peripheral device to, acting as a gateway peripheral device, coordinate the individual pairing processes of each of the other competing pairing peripheral devices in the group. As such, where the other competing pairing peripheral devices in the group detect the group ID pairing beacon from the first peripheral device, these competing pairing peripheral devices act as subordinate to the first peripheral device acting as the gateway peripheral device.

In an embodiment, the first peripheral device may broadcast the passcode list to each of the competing subordinate pairing peripheral devices when the time has come for each of these competing subordinate pairing peripheral devices to be paired with the information handling system. This allows an automatic pairing of each of the competing subordinate pairing peripheral devices to the information handling system without the need for the user to provide a pin or other alphanumeric code to continue with the pairing process due to the competing subordinate pairing peripheral devices being given the passcode list.

In an embodiment, as the first peripheral device is being initially paired with the information handling system, the hardware processing device of the first peripheral device may execute computer-readable program code of a peripheral device (PD) classifier to provide, to the information handling system, a listing of available services at the peripheral device that define how a user may interact with the peripheral device to perform a predefined gesture at the peripheral device to accept pairing of the first peripheral device and associated subordinate peripheral devices in a sequence to the information handling system. Where the available services provided to the information handling system indicates that an alphanumeric code cannot be input by a user (e.g., a mouse), the information handling system may instead provide instructions to a user (e.g., via a video display device) related on how to perform a predefined gesture to accept this pairing of the first peripheral device to the information handling system. Thus, in one example embodiment, a headless peripheral device may be used as the first peripheral device that allows a user to grant authority to pair the first peripheral device to the information handling system via this gesture when prompted. The gateway first peripheral device will communicate with the subordinate peripheral devices in an established queue of subordinate peripheral devices to pair in a sequence and avoid pairing collisions.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a docking station 156, a mouse 154, a trackpad 152, a stylus 150, a keyboard 148, a video/graphics display device 146, the first wireless peripheral device 156, the second wireless peripheral device 178, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such as a wireless headset 158, a keyboard 148, a mouse 154, video display device 146, stylus 150, trackpad 152, the first wireless peripheral device 156, or the second wireless peripheral device 178 described herein, among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a wired or wireless input/output device 144 such as the first wireless peripheral device 156 and second wireless peripheral device 178 or that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices including the first wireless peripheral device 156 and second wireless peripheral device 178, via, for example, a Bluetooth® or Bluetooth® Low Energy (BLE) protocols. In other embodiments, Bluetooth®, BLE or other WPAN or WLAN may be used for communication with and among a wireless peripheral devices such as the first wireless peripheral device 156, a second wireless peripheral device 178, or any other wireless peripheral device that is associated with the first wireless peripheral device 156 and second wireless peripheral device 178 as a group of wireless peripheral devices to be paired with the information handling system 100.

In other embodiments, a WAN, WWAN, LAN, and WLAN may each include an AP 140 or base station 142 used to operatively couple the information handling system 100 to a network 138 via a wireless interface adapter 130. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may be operatively and wirelessly coupled to any number of wireless peripheral devices including the first wireless peripheral device 156 and second wireless peripheral device 178 described herein. Again, this wireless coupling, may include a pairing requirement before active wireless input/output (I/O) communications are established and may include the communication from any wireless peripheral device that initiates a pairing communication with the information handling system 100 to engage in the pairing process. During pairing, any of the first wireless peripheral device 156, second wireless peripheral device 178, or any other wireless peripheral device within a group of wireless peripheral devices may be initiated by a user. This initiation process may include the user activating a power button, switch, or other key that causes, in an embodiment, a first peripheral device PMU 168 and second peripheral device PMU 184 to provide power to the first peripheral device microcontroller 158 and second peripheral device microcontroller 180, respectively. It is appreciated that the first wireless peripheral device 156 and second wireless peripheral device 178 may be initiated concurrently such that each may begin to attempt to pair with the information handling system 100. In previous operations of pairing wireless peripheral devices to the information handling system 100, this may result in pairing collisions between the individual wireless peripheral devices (e.g., 156 and 178) thereby increasing the duration of time to pair these wireless peripheral devices to the information handling system 100 and may result in the inability of some wireless peripheral devices to be paired with the information handling system 100.

To minimize pairing collisions between the first wireless peripheral device 156 and second wireless peripheral device 178 or other wireless peripheral devices attempting to pair with the information handling system 100, the systems and methods described herein allow for an initial pairing peripheral device to automatically determine itself as and then act as a gateway device. In an embodiment, each of the first peripheral device microcontroller 158 and second peripheral device microcontroller 180 or other wireless peripheral devices execute computer-readable program code instructions of a wireless pairing anti-collision module 164. Execution of the computer-readable program code instructions of the wireless pairing anti-collision module 164 causes each of the first wireless peripheral device 156 and second wireless peripheral device 178 or other wireless peripheral devices to, independently, determine which of the first wireless peripheral device 156 and second wireless peripheral device 178 or other wireless peripheral devices was the first peripheral device to broadcast a group identification (ID) pairing beacon among the group of wireless peripheral devices. In an embodiment, the independent execution of the wireless pairing anti-collision module 164 by both the first peripheral device microcontroller 158 of the first wireless peripheral device 156 and the second peripheral device microcontroller 180 of the second wireless peripheral device 178 or other wireless peripheral devices causes each, when initiated, to attempt to detect a broadcast of this group ID pairing beacon.

It is appreciated that each of the first wireless peripheral device 156 and second wireless peripheral device 178 or other wireless peripheral devices may not be initiated at the exact same time but only concurrently with one of the first wireless peripheral device 156 and second wireless peripheral device 178 being the first peripheral device, temporally, among this plurality of peripheral devices to be the first to attempt to detect a broadcast of the group ID pairing beacon. Thus, only one of the first wireless peripheral device 156, second wireless peripheral device 178, or any other to-be paired wireless peripheral device may detect that the group ID pairing beacon is not being broadcasted upon expiration of its timer. For explanation purposes, in an example embodiment where the first wireless peripheral device 156 may have been initiated prior to the second wireless peripheral device 178, the first wireless peripheral device 156, executing the computer-readable program code of the wireless pairing anti-collision module 164, determines that a group ID pairing beacon is not detected due to no other peripheral device, including the second wireless peripheral device 178, being initiated and capable of broadcasting the group ID pairing beacon within expiration of a period of time.

In an embodiment, the first wireless peripheral device 156 may wait for this initial period of time to determine whether the group ID pairing beacon is detected or not prior to proceeding as described herein. In one example embodiment, the initial period of time may be 300 ms or less. In another example embodiment, the initial period of time may be between 200 ms to 400 ms. Any period of time set for the initial period of time is contemplated in the present specification. Where a group ID pairing beacon has been detected by the first wireless peripheral device 156 (e.g., detected by the first wireless peripheral device radio 172, first wireless peripheral device RF front end 174, and first wireless peripheral device antenna 176), the first peripheral device microcontroller 158 executing the wireless pairing anti-collision module 164 may then cause the first wireless peripheral device 156 to act as a subordinate peripheral device whose pairing to the information handling system 100 is controlled by the peripheral device who was broadcasting the group ID pairing beacon (e.g., now acting as the gateway peripheral device). However, where the first wireless peripheral device 156 does not detect a broadcasted group ID pairing beacon, the first wireless peripheral device 156 acts as a gateway peripheral device used to control and manage the pairing of other peripheral devices such as the second wireless peripheral device 178 to the information handling system 100 in embodiments herein. In an embodiment, the first wireless peripheral device 156, now acting as the gateway wireless peripheral device, may broadcast the group ID pairing beacon so that all other competing wireless peripheral devices may detect the broadcast and assume the role of a subordinate peripheral device.

In an embodiment, the group ID pairing beacon includes data describing a common PD group ID 162 that is maintained on a first peripheral device storage device 160 and second peripheral device storage device 182 of a first wireless peripheral device 156 and second peripheral device storage device 182, respectively. In an embodiment, for all peripheral devices within a group of peripheral devices that are to be paired with the information handling system 100, this common PD group ID 162 may be stored on respective wireless peripheral device storage devices. In an embodiment, each wireless peripheral device is capable of broadcasting this group ID pairing beacon when acting as a gateway peripheral device. In an embodiment, the first wireless peripheral device 156 and second wireless peripheral device 178 as well as any other number of peripheral devices may be associated with each other using this common PD group ID 162 when a user has purchased these peripheral devices. For example, an internet technology decision maker (ITDM) may purchase a new computer workspace for a new employee. This purchase may include the purchase of the information handling system 100 as well as any number of wireless peripheral devices including a wireless mouse 154, a wireless keyboard 148, a wireless video display device 146, a wireless stylus 148, among other peripheral devices. Thus, although FIG. 1 shows a first wireless peripheral device 156 and a second wireless peripheral device 178, it is appreciated that the first wireless peripheral device 156 and second wireless peripheral device 178 may be any type of wireless peripheral device and that any number of wireless peripheral devices may be grouped together at this initial purchase. The common peripheral device group ID 162 may be stored on each of the grouped peripheral devices purchased, such as in a group of peripheral devices. The common peripheral device group ID 162 may be stored by the manufacturer, seller, or an ITDM in embodiments herein. In other scenarios, a user may complete a similar purchase via an online retail store that includes the information handling system 100 and plurality of wireless peripheral devices (e.g., 156, 178, 146, 148, 150, 152, 154, etc.) with each of the wireless peripheral devices maintaining a common PD group ID 162 on their respective peripheral device storage devices (e.g., first peripheral device storage device 160 and second peripheral device storage device 182). Because this common PD group ID 162 is common among all of the wireless peripheral devices to be wireless coupled to the information handling system 100, the broadcasting of the group ID pairing beacon by a gateway peripheral device will be recognized by each subsequent, competing wireless peripheral devices. It is also appreciated that the common PD group ID 162 may be user-specific such that any new wireless peripheral device purchased by or on behalf of the user may have this common PD group ID 162 stored on its respective peripheral device storage device so that this newly-purchased wireless peripheral device may be operatively and wirelessly coupled with the information handling system 100 pursuant to the systems and methods described herein.

Again, where the first wireless peripheral device 156 has not detected a broadcast of the group ID pairing beacon including the common PD group ID 162, the first wireless peripheral device 156 may act as the gateway peripheral device. As such, the first wireless peripheral device 156, in this example embodiment, has become the initial peripheral device that is to act as the gateway peripheral device relative to other competing and subordinate peripheral devices such as the second wireless peripheral device 178. It is appreciated, therefore, that these wireless peripheral devices 156, 178, etc. are competing to determine which of these devices are to act as the gateway peripheral device thereby rendering all other competing peripheral devices to the role of a subordinate peripheral device that is to be directed by the gateway peripheral device on when and how to pair with the information handling system 100.

In an embodiment, the first wireless peripheral device 156 may, after being determined to be the gateway peripheral device, begin to broadcast the group ID pairing beacon for subsequently-initiated wireless peripheral devices to detect and be directed to act as subordinate peripheral devices. This broadcast of the group ID pairing beacon informs the other competing peripheral devices to await for directions from the first wireless peripheral device 156 acting as the gateway peripheral device. In an embodiment, the first wireless peripheral device 156 acting as the gateway peripheral device may cause the group ID pairing beacon to be broadcasted using a generic attribute profile (GATT) transmission such as under a BLE standard. This GATT transmission may initiate a communication with each of the subsequently-initiated peripheral devices including the second wireless peripheral device 178 to establish a gateway/subordinate relationship with each of the other peripheral devices and provide directions to wait for pairing instructions as described herein.

As the first wireless peripheral device 156 begins to, via execution of the wireless pairing anti-collision module 164 by the first peripheral device microcontroller 158, broadcast the group ID pairing beacon and establish these GATT communications with each of the other peripheral devices (e.g., the second wireless peripheral device 178), the first wireless peripheral device 156 will also initiate communications with the information handling system 100 in order to pair the first wireless peripheral device 156 with the information handling system 100. In an embodiment, the first wireless peripheral device 156 may initiate communication with the information handling system 100 also using a GATT communication protocol. In an embodiment, the first wireless peripheral device 156 may broadcast the pairing request to the information handling system 100 that includes, among other data, the common PD group ID 162. The common PD group ID 162 identifies to the information handling system 100 that the first wireless peripheral device 156 is one of a group of wireless peripheral devices that may be operatively coupled to the information handling system 100.

In an embodiment, as the request to pair is received from the information handling system 100 and granted by the first wireless peripheral device 156, the information handling system 100 may request to discover available resources at the first wireless peripheral device 156. In the present specification and in the appended claims, the term "available resources" includes input and output capabilities of the first wireless peripheral device 156 (or any other pairing peripheral device) through which the user, via the first wireless peripheral device 156, may manipulate the first wireless peripheral device 156 to perform a gesture-based pairing operation. In an example embodiment, the first peripheral device microcontroller 158 of the first wireless peripheral device 156 may execute computer-readable program code of a peripheral device (PD) classifier 166 to provide the available resources at the first wireless peripheral device 156 to the information handling system 100. For example, where the first wireless peripheral device 156 is a wireless mouse, the input capabilities may include a left button, a right button, a scrolling wheel, and other buttons and input devices often associated with the wireless mouse, and which may be particular to the specific make, model, and type of wireless mouse. This wireless mouse does not, however, include output devices such as a display device. This makes the wireless mouse a headless peripheral device. Execution of the computer-readable program code of the peripheral device classifier 166 causes the first peripheral device microcontroller 158 to provide a listing of the available resources at the first wireless peripheral device 156 including these input and output capabilities (or lack thereof). As described herein, the user may later be requested, via a video display device 146 of the information handling system 100, to press any number of buttons, scroll the scrolling wheel, and/or move the mouse on a surface in any sequence to provide gesture authentication to the information handling system 100 for the first wireless peripheral device 156 to authenticate pairing with the information handling system 100. This process may be conducted for any type of wireless peripheral device that is acting as the gateway peripheral device to provide authentication to the information handling system 100 that the first gateway wireless peripheral device 156 is authorized to pair with the information handling system 100 thereby adding a layer of security to this initial pairing process. Thus, a plurality of types of wireless input/output devices such as headless input/output devices may be paired with the information handling system 100 when they act as a gateway peripheral device as described herein. In embodiments herein, this provides added security indicating that subordinate wireless peripheral devices, coordinated by the gateway peripheral device are also authorized to pair also with the information handling system in embodiments herein. The wireless mouse, in the example above, is such a headless wireless peripheral device that does not have the capabilities to allow a user to input an authentication code or other pairing code via alphanumeric input.

In an embodiment, the first wireless peripheral device 156 may also transmit seed data to be used, concurrently, by both the hardware processor 102 of the information handling system 100 and the first peripheral device microcontroller 158 of the first wireless peripheral device 156 to generate a list of secure passcodes to be stored as the passcode list 194 on the first peripheral device storage device 160 of the first wireless peripheral device 156 and a data storage device of the information handling system 100. These generated secure passcodes within the passcode list 194 may be later used by the subordinate peripheral devices (e.g., second wireless peripheral device 178 in this example embodiment), at the direction of the first wireless peripheral device 156, to automatically pair the subordinate peripheral devices to the information handling system 100 via a sequence determined by the gateway first wireless peripheral device 156. In an embodiment, one or more seed values may be generated by the first peripheral device microcontroller 158 using, for example, a random number generator (RNG) and sent to the information handling system 100 for generation of the list of secure passcodes of the passcode list 194.

In an embodiment, both the hardware processor 102 of the information handling system 100 and the first peripheral device microcontroller 158 of the first wireless peripheral device 156 may concurrently execute a hash loop algorithm 196 or function that generates this list of secure passcodes of the passcode list 194. The hash loop algorithm 196 may include computer-readable program code stored on a data storage device and executed by the hardware processors (e.g., hardware processor 102 and first peripheral device microcontroller 158) that generates this list of secure passcodes of the passcode list 194. In an embodiment, these passcodes of the passcode list 194 are based on a time elapsed since a reference time was defined by the first peripheral device microcontroller 158 and provided to the information handling system 100. In one embodiment, the hash loop algorithm 196 includes a time-based hash loop algorithm output that is based on pass-in parameters such as a first seed value and a second seed value. The time-based hash loop algorithm runs a loop of advance encryption algorithms and a secure hash algorithm 256 (SHA256) hybrid algorithm to generate a series of passcodes of the passcode list 194 based on a processing time of each of the passcodes of the passcode list 194. In an embodiment, each of the information handling system 100, first wireless peripheral device 156, second wireless peripheral device 180, as well as any other pairable wireless peripheral device may include computer-readable program code instructions of the same hash loop algorithm 196 described herein such that each hardware device may generate this list of secure passcodes of the passcode list 194 independently. The is done so that these hardware devices do not transmit any passcodes or passcode lists 194 via, for example, a BT or BLE communication thereby preventing a third-party from accessing these passcodes. In an example embodiment, the hash loop algorithm 196 may concatenate a first seed value (e.g., generated by the RNG), a second seed value (e.g., generated by the RNG), or a time stamp or timeblock tick generated by a timeblock, to generate the passcodes of the passcode lists 194 to be used by the information handling system 100 and any wireless peripheral device (e.g., 156, 178) to be paired with the information handling system 100. In an example embodiment, the timeblock 198 may provide a first key derived based on a current time reference. For example, where the data is Apr. 21, 2024 and the current time is 11 pm, timeblock at the information handling system 100 may generate a time stamp or time tick of 215799 (e.g., a hexadecimal value). By selecting a current time, the timeblock prevents any overlapping of time stamps or time ticks because old time stamps based on older dates and/or times will not be used because time keeps moving forward. In an embodiment, by providing this first key seed to a third input at a SHA256 module, a first output from the SHA256 module may be used at a first input at a first AES algorithm and a second output from the SHA265 module may be used as a second input at a second AES algorithm. Output from the first AES algorithm is used as a key value at the second AES algorithm while output from the second AES algorithm is used as a key value at the first AES algorithm. This constitutes an inner loop of the hashloop algorithm which is repeated each time the SHA256 module creates new first output and new second output as a result of time stamp or time tick from the timeblock 498. In an embodiment, because time will have elapsed since the first wireless peripheral device 156 had been paired with the information handling system 100, the use of the time stamp or time tick from the timeblock 498, a second time stamp or time tick is used by the hashloop algorithm 196 of the second wireless peripheral device 180 and a different passcode or list of passcodes of the passcode list 194 may be generated. In an embodiment, the information handling system 100 may control the time stamp or time tick used by each of the wireless peripheral devices 156, 178.

In an embodiment, the first AES output is used as a first input into a SHA256 algorithm, and the second AES output is used as a second input into that SHA256 algorithm. The outputs from the SHA256 module and the outputs from the first AES algorithm and the second AES algorithm may constitute a loop control that is used to control or moderate how the passcodes are to be moderated. In an embodiment, the first output value (output-L16) from the SHA256 algorithm may be used as a first input to a hash-based message authentication code (HMAC) while a second output (output-H16) is used as a second input to the HMAC in order to generate the list of secure passcodes of the passcode list 194. Because the timeblock is used, any number of passcodes of the passcode list 194 may be generated based on a time that has elapsed since the information handling system 100 had set a reference time and sent it to the first wireless peripheral device 156. This may be further distributed to additional, subordinate wireless peripheral devices. In one embodiment, each of the hardware processor 102 of the information handling system 100 and the first peripheral device microcontroller 158 of the first wireless peripheral device 156 may generate the same list of secure passcodes of the passcode list 194 and maintain that list of secure passcodes of the passcode list 194 generated on a data storage device (e.g., the first peripheral device storage device 160) to be used later to automatically pair each of the other or subordinate wireless peripheral devices (e.g., second wireless peripheral device 178) to the information handling system 100. In an embodiment, the first peripheral device microcontroller 158 of the first wireless peripheral device 156 may cause that the first seed value, second seed value, and time stamp be transmitted to the individual subordinate peripheral devices to be paired with the information handling system 100. This allows each of the subordinate peripheral devices to generate the same list of secure passwords at their respective peripheral device microcontrollers for preparation to be automatically paired with the information handling system 100 when directed or coordinated by the first peripheral device microcontroller 158 of the first wireless peripheral device 156.

After confirming that the list of secure passcodes of the first peripheral device storage device 160 has been generated, the hardware processor 102 of the information handling system 100 may request that the gesture be performed by the user at the first wireless peripheral device 156 in order to authenticate and accept pairing of the first wireless peripheral device 156 to the information handling system 100. In an example embodiment, upon the gesture being performed and confirmed with the human interface device (HID) input to the information handling system 100 a method of deriving one of the passcodes of the passcode list 194 may be transmitted from the first wireless peripheral device 156 to the information handling system 100 in order to perform a secure pairing of the first wireless peripheral device 156 to the information handling system 100. In another example embodiment, a passcode indirect index or hint may be sent from the first wireless peripheral device 156 to the information handling system 100. In either of these example embodiments, a passcode within the passcode list 194 is not sent wirelessly thereby preventing any third-party from intercepting this wireless transmission. Indeed, because the hash loop algorithm 196 is known to both the information handling system 100 and the first wireless peripheral device 156, by transmitting a hint such as data used to derive a specific passcode within the passcode list 194, the information handling system may process this hint and derive a correct or specific passcode within the passcode list 194 in order to confirm authorization to pair the first wireless peripheral device 156 to the information handling system 100.

After the first wireless peripheral device 156 has been paired with the information handling system 100, the first wireless peripheral device 156 acting as the gateway peripheral device, may begin to coordinate with the other wireless peripheral devices such as the second wireless peripheral device 178 to begin to pair with the information handling system 100. This process may include notifying the second wireless peripheral device 178 of the pairing completion between the first wireless peripheral device 156 and the information handling system 100. Still further, the first wireless peripheral device 156 may include instructions to the second wireless peripheral device 178 to pair with the information handling system 100 as next in the sequence while also informing other wireless peripheral devices to wait until the second wireless peripheral device 178 has been paired with the information handling system 100. Prior to or after the first wireless peripheral device 156 directs the second wireless peripheral device 178 to pair with the information handling system 100, the first wireless peripheral device 156 may send the first seed value, the second seed value, and the time stamp or other time reference for the second peripheral device microcontroller 180 to execute the hash loop algorithm 196 stored on the second peripheral device storage device 182. Because the second peripheral device microcontroller 180 is to generate the same list of secure passcodes of the passcode list 194 as those generated by the first peripheral device microcontroller 158 and hardware processor 102, the hash loop algorithm 196 may be the same as those used by the first peripheral device microcontroller 158 to generate this list of secure passcodes of the passcode list 194. As a result, the pairing process of the second wireless peripheral device 178 may be automatically completed based on the first wireless peripheral device 156 conveying hash loop algorithm 196 parameters to the information handling system 100 and any other wireless peripheral device (e.g., second wireless peripheral device 178) as well as an index of the passcode list. As such, the pairing process of the second wireless peripheral device 156 at the second peripheral device microcontroller 180 will be aware of the correct passcode to pick from within the passcode list 194. Similar to the pairing process between the first wireless peripheral device 156 and the information handling system 100, the second wireless peripheral device 156 may also send a passcode indirect index or hint to the information handling system 100 to confirm with the information handling system 100 is authorized to pair with the second wireless peripheral device 178.

In an embodiment, the second wireless peripheral device 178 as well as any other wireless peripheral device other than the first wireless peripheral device 156 may engage in an extended directed advertisement with the information handling system 100. Unlike a generic Bluetooth® pairing process, the extended directed advertisement protocol targets the wireless transmissions only to the information handling system 100 instead if generally broadcasting to any device within a vicinity of the pairing devices such that other information handling systems cannot hijack the pairing requests sent from these wireless peripheral devices (e.g., 156, 178). To accomplish this, the first wireless peripheral device 156 may send the Bluetooth® address of the information handling system 100 to the second wireless peripheral device 178 which uses this Bluetooth® address with extended direct advertisement such that the broadcast from the second wireless peripheral device 178 is not hijacked by third-party information handling systems. Unlike the second wireless peripheral device 178 (or any other nth wireless peripheral device), the first wireless peripheral device 156 may not be allowed to use the Bluetooth® extended directed advertisement method to advertise because the first wireless peripheral device 156 would not be made aware of the Bluetooth® address of the information handling system 100 prior to communicating with the information handling system 100. However, after pairing with the information handling system 100, the first wireless peripheral device may be provided with the Bluetooth® address of the information handling system 100 and can transmit this address to the other wireless peripheral devices thereby facilitating the ability of these wireless peripheral devices to directly communicate with the information handling system 100 using the Bluetooth® extended directed advertisement protocols.

Because the information handling system 100 has stored this list of secure passcodes of the passcode list 194 on a data storage device within the information handling system 100, the hardware processor 102 of the information handling system 100 may cross-reference a passcode derived from the passcode indirect index or hint and received from the second wireless peripheral device 178 with that list of secure passcodes and either allow or deny pairing with the second wireless peripheral device 178. It is noted that, unlike the first wireless peripheral device 156, the user is not required to perform a predefined gesture at the second wireless peripheral device 178. This is because the second wireless peripheral device 178 has the use of the list of secure passcodes and the independent execution of the hash loop algorithm 196, similar to the information handling system 100 and first wireless peripheral device, used to derive or generate the list of secure passcodes via use of the first seed value and second seed value. The passcode to be used to pair the information handling system 100 to the second wireless peripheral device 178 may be hinted to the information handling system using a passcode indirect index or hint that may be sent form the second wireless peripheral device 178 to the information handling system 100, and the index may indicate which passcode to use thus providing for a silent authentication may be completed without any gesture required or manual entry of passcodes. Additionally, the initial transmission of the available services of each of the competing subordinate wireless peripheral devices (e.g., second wireless peripheral device 178) need not be conducted as a result of not needing to perform the predetermined gesture.

It is appreciated that the first seed value, second seed value, and time stamp may be transmitted, securely via a GATT communication, to any of the competing peripheral devices (e.g., second wireless peripheral device 178) at any time and may occur prior to the first wireless peripheral device 156 informing the second wireless peripheral device 178 that the first wireless peripheral device 156 has been paired with the information handling system 100 and/or before directing the second wireless peripheral device 178 to initiate the pairing process with the information handling system 100. In an embodiment, as the first wireless peripheral device 156 transmits the first seed value and second seed value to the information handling system 100, the first wireless peripheral device 156 may also transmit this data to the second wireless peripheral device 178 and any other subordinate wireless peripheral device.

It is appreciated that the processes associated with the first wireless peripheral device 156 coordinating the pairing of the second wireless peripheral device 178 to the information handling system 100 may be similarly repeated for every other wireless peripheral device within the group of wireless peripheral devices in a sequence determined by the gateway first peripheral device 156. This sequence may be based on an order that the subordinate wireless peripheral devices were initiated or responded to the gateway first peripheral device 156 sending a group ID pairing beacon in example embodiments. In an embodiment, the possession of the common PD group ID 162 by each wireless peripheral devices allows these wireless peripheral devices to be included within the group of wireless peripheral devices and may be used to identify each of the wireless peripheral devices as being part of that group that are allowed to be wirelessly paired with the information handling system 100. In an embodiment, the first wireless peripheral device 156 may request that the subordinate peripheral devices provide the common PD group ID 162 in order to identify that these wireless peripheral devices are allowed to be wirelessly coupled to the information handling system 100 and should be put within a pairing queue maintained and orchestrated by the first wireless peripheral device 156 acting as the gateway peripheral device.

In order to communicate with the information handling system 100, each of the first wireless peripheral device 156 and second wireless peripheral device 178 include a wireless peripheral device radio 172, 188, a wireless peripheral device RF front end 174, 190, and a wireless peripheral device antenna 176, 192. These allow each of the first wireless peripheral device 156 and second wireless peripheral device 178 to transceive data to and from the wireless interface adapter 130 of the information handling system 100 via a second antenna 136-2. In an embodiment, these transceptions between the first wireless peripheral device 156, second wireless peripheral device 178, and information handling system 100 may be Bluetooth® or BLE® wireless, or other WPAN or WLAN communications that operate under those radio frequencies associated with those transception protocols.

In an embodiment, each of the first wireless peripheral device 156 and second wireless peripheral device 178 may further include a first peripheral device PMU 168 and second peripheral device PMU 184, respectively. The PMUs 168, 184 may include hardware controllers and executable machine-readable code instructions to manage the power provided to the components of the first wireless peripheral device 156 and second wireless peripheral device 178 such as the first peripheral device microcontroller 158 and second peripheral device microcontroller 180 and other hardware components described herein. In an embodiment, the PMUs 168, 184 may monitor power levels. The PMUs 168, 184 may regulate power from a power source such as the first wireless peripheral device battery 170 and second wireless peripheral device battery 186 respectively. In an embodiment, the batteries 170, 186 may provide power to the components of the first wireless peripheral device 156 and second wireless peripheral device 178 via wired connections formed on, for example, a printed circuit board (PCB) within the respective wireless peripheral devices 156, 178.

The systems and methods described herein may increase the efficiency and speed at which a group of wireless peripheral devices 146, 148, 150, 152, 154, 156, 178 are wirelessly paired and then operatively coupled to the information handling system 100 in a collision-free manner. Additionally, as described herein, the second wireless peripheral device 178 as well as any other subordinate wireless peripheral device other than the first wireless peripheral device 156 may engage in an extended directed advertisement with the information handling system 100. This facilitates the ability of these subordinate wireless peripheral devices to directly communicate with the information handling system 100 using the Bluetooth® extended directed advertisement protocols thereby preventing third-party hijacking of the communications between these wireless peripheral devices and the information handling system while provide for collision free pairing in a sequence coordinated by the first, gateway wireless peripheral device. The efficiency and speed of this pairing process is facilitated by a first-initialized wireless peripheral device 146, 148, 150, 152, 154, 156, 178 determining that no group ID pairing beacon is being broadcasted and causing that wireless peripheral device 146, 148, 150, 152, 154, 156, 178 to assume the role of a gateway peripheral device that controls the pairing of any subordinate peripheral device with the information handling system. With the initial wireless peripheral device (e.g., first wireless peripheral device 156) assuming the role of the gateway peripheral device, pairing collisions are avoided due to this gateway peripheral device automatically directing each of the subordinate peripheral devices (e.g., second wireless peripheral device 178) when to initiate a pairing process with the information handling system 100. Additionally, each of the first wireless peripheral device 156, second wireless peripheral device 178, and any other subordinate wireless peripheral device is paired to the same host information handling system 100 despite the existence of other information handling systems present to detect the broadcast of the first wireless peripheral device 156 described herein. Additionally, the pairing of any subordinate wireless peripheral device is facilitated by the gateway first wireless peripheral device 156 furnishing information such as a token, groupID, passcode index for passcodes, and Bluetooth® address for the host information handling system 100, passcode selection is automatically enabled. Even further, with the provisioning of the Bluetooth® address of the information handling system 100 to each of the subordinate (e.g., second wireless peripheral device 178) wireless peripheral devices by the gateway first wireless peripheral device 156, each subordinate wireless peripheral device is thus directed to the exact host information handling system 100 via extended directed advertisement using the Bluetooth® address of the host information handling system 100 and may communicate directly with the information handling system thereby preventing hijacking of the pairing session by third-party information handling systems. Still further, the efficiency and speed at which the group of wireless peripheral devices 146, 148, 150, 152, 154, 156, 178 are coupled to the information handling system 100 is also facilitated via the generation of the passcode list that can allow each of the subordinate peripheral devices to use a passcode to securely pair with the information handling system 100 without requiring a predetermined gesture or manual entry or confirmation of a passcode to be performed at each individual subordinate peripheral device. The initial pairing process of the first wireless peripheral device 156 to the information handling system 100 does, however, include the user performing a predetermined gesture to further securely pair the first wireless peripheral device 156, acting as the gateway peripheral device to the information handling system 100 adding another level of security as a trusted gateway wireless peripheral device. Additionally, each of the first wireless peripheral device 156, second wireless peripheral device 178, or other peripheral devices in the group and information handling system 100 use a time-session lock secure hash loop algorithm that dynamically generates a unique series of passcodes that uniquely identifies each wireless peripheral device to be paired with the information handling system 100. This results in an anti-replay attack design and a non-static group series of passcodes in the passcode list 194.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
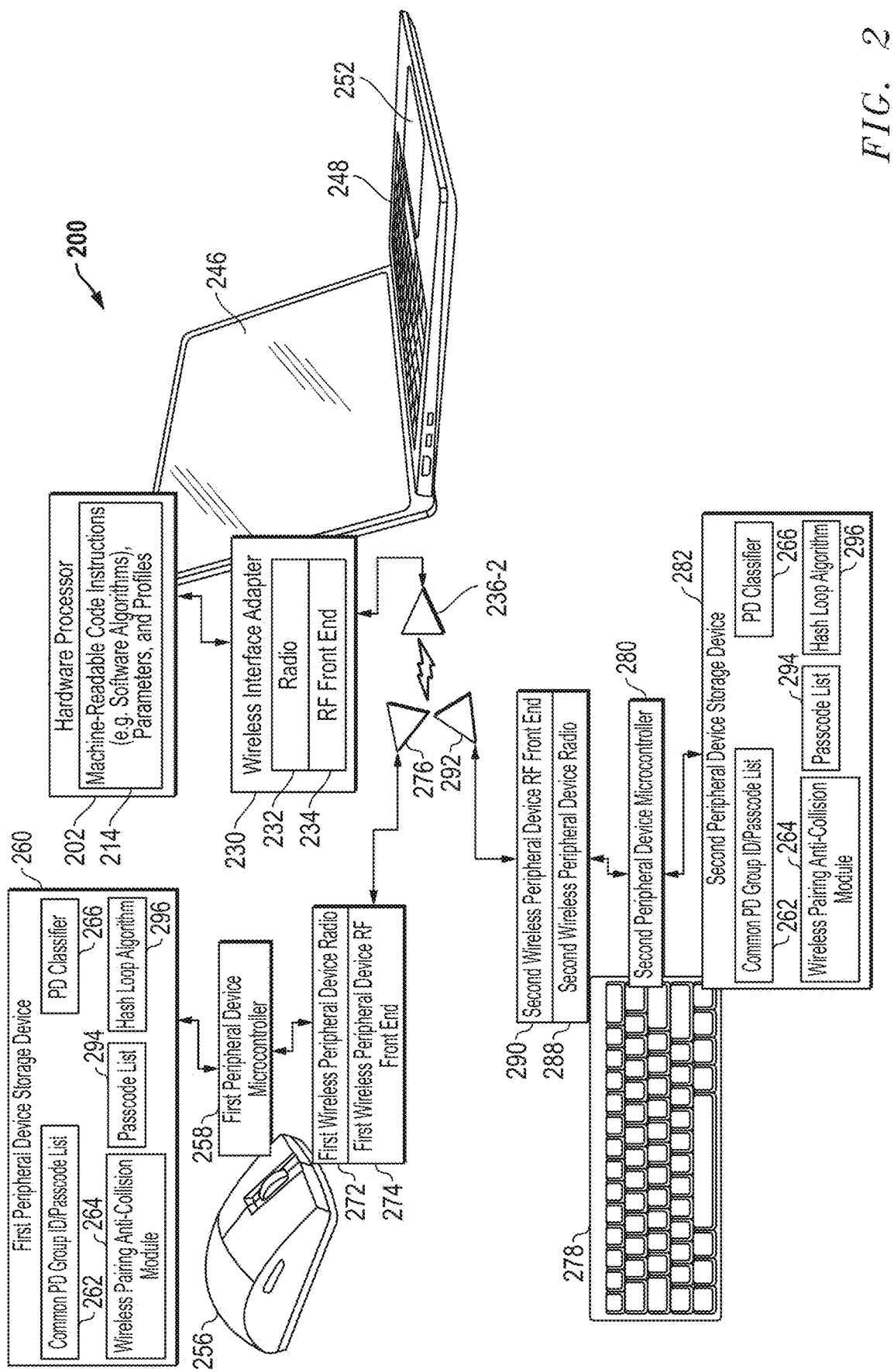
FIG. 2 is a graphic and block diagram illustrating an information handling system that may be operatively coupled to a first peripheral device and second peripheral device among a group of peripheral devices with one of the first and second peripheral device acting as a gateway peripheral device for pairing according to an embodiment of the present disclosure.

FIG. 2 is a graphic and block diagram illustrating an information handling system 200 that may be operatively coupled to a first wireless peripheral device 256 and second wireless peripheral device 278 among a group of peripheral devices with one of the first wireless peripheral device 256 and second wireless peripheral device 278 acting as a gateway peripheral device according to an embodiment of the present disclosure. FIG. 2 shows that the information is a laptop-type information handling system. It is appreciated that the information handling system 200 may be any type of information handling system. The information handling system 200 of FIG. 2 also shows a built-in keyboard 248 and trackpad 252 that allow the user to provide input to the information handling system 200.

Additionally, FIG. 2 shows a wireless mouse as the first wireless peripheral device 256 and a wireless keyboard as the second wireless peripheral device 278. It is appreciated that the first wireless peripheral device 256 and second wireless peripheral device 278 may be any type of wireless peripheral device such as a wireless stylus, a wireless video display device, a wireless trackpad, and the like and the wireless mouse and wireless keyboard are merely examples of wireless peripheral devices that can be wireless coupled to the information handling system 200.

It is appreciated that, in order to communicate with the information handling system 200, each of the first wireless peripheral device 256 and second wireless peripheral device 278 include a wireless peripheral device radio 272, 288, a wireless peripheral device RF front end 274, 290, and a wireless peripheral device antenna 276, 292. These hardware devices allow each of the first wireless peripheral device 256 and second wireless peripheral device 278 to transceive data to and from the wireless interface adapter 230 (with its radio 232 and RF front end 234) of the information handling system 200 via an antenna 236-2. In an embodiment, these transceptions between the first wireless peripheral device 256, second wireless peripheral device 278, and information handling system 200 may be Bluetooth® or BLE® wireless, or other WPAN or WLAN communications using a GATT protocol and that operate under those radio frequencies associated with those transception protocols.

In an embodiment, each of the first wireless peripheral device 256 and second wireless peripheral device 278 may further include a first peripheral device PMU 268 and second peripheral device PMU 284, respectively. The PMUs 268, 284 may include hardware controllers and executable machine-readable code instructions to manage the power provided to the components of the first wireless peripheral device 256 and second wireless peripheral device 278 such as the first peripheral device microcontroller 258 and second peripheral device microcontroller 280 and other hardware components described herein. In an embodiment, the PMUs 268, 284 of the wireless peripheral devices 256, 278 may monitor power levels. The PMUs 268, 284 may regulate power from a power source such as the first wireless peripheral device battery 270 and second wireless peripheral device battery 286 respectively. In an embodiment, the batteries 270, 286 may provide power to the components of the first wireless peripheral device 256 and second wireless peripheral device 278 via wired connections formed on, for example, a printed circuit board (PCB) within the respective wireless peripheral devices 256, 278.

As described herein, the information handling system 200 may be operatively and wirelessly coupled to any number of wireless peripheral devices including the first wireless peripheral device 256 and second wireless peripheral device 278 described herein. Again, this wireless coupling may include a pairing step that includes initial communications from any wireless peripheral device that initiated a pairing communication with the information handling system 200 to engage in the pairing process.

During pairing, any of the first wireless peripheral device 256, second wireless peripheral device 278, or any other wireless peripheral device within a group of wireless peripheral devices may be initiated by a user. This initiation process may include the user activating a power button, switch, or other key that causes, in an embodiment, a first peripheral device PMU 268 and second peripheral device PMU 284 to provide power to the first peripheral device microcontroller 258 and second peripheral device microcontroller 280, respectively. It is appreciated that the first wireless peripheral device 256 and second wireless peripheral device 278 may be initiated concurrently such that each may begin to attempt to pair with the information handling system 200. In previous operations of pairing wireless peripheral devices to the information handling system 200, this may result in pairing collisions between the individual wireless peripheral devices (e.g., 256 and 278) thereby increasing the duration of time to pair these wireless peripheral devices to the information handling system 200 and may result in the inability of some wireless peripheral devices to not be paired with the information handling system 200. Still further, these pairing collisions may result in the user being confused as to which wireless peripheral device is being paired with the information handling system 200 as well as whether the pairing processes of all wireless peripheral devices have been completed.

To avoid a pairing collisions between the first wireless peripheral device 256 and second wireless peripheral device 278 or other wireless peripheral devices attempting to pair with the information handling system 200, the systems and methods described herein allow for an initial pairing peripheral device to act as a gateway device. In an embodiment, each of the first peripheral device microcontroller 258 and second peripheral device microcontroller 280 or other wireless peripheral device microcontroller execute computer-readable program code instructions of an wireless pairing anti-collision module 264. Execution of the computer-readable program code instructions of the wireless pairing anti-collision module 264 causes each of the first wireless peripheral device 256 and second wireless peripheral device 278 or other wireless peripheral device to, independently, determine which of the first wireless peripheral device 256 and second wireless peripheral device 278 or other wireless peripheral device was the first peripheral device to broadcast a group identification (ID) pairing beacon. In an embodiment, the independent execution of the wireless pairing anti-collision module 264 by both the first peripheral device microcontroller 258 of the first wireless peripheral device 256 and the second peripheral device microcontroller 280 of the second wireless peripheral device 278 or other wireless peripheral device causes each, when initiated, to attempt to detect a broadcast of this group ID pairing beacon.

It is appreciated that each of the first wireless peripheral device 256 and second wireless peripheral device 278 may not be initiated at the exact same time but concurrently within a similar timeframe with one of the first wireless peripheral device 256 and second wireless peripheral device 278 being the first peripheral device, temporally, among this plurality of peripheral devices to be the first to attempt to detect a broadcast of the group ID pairing beacon. Thus, only one of the first wireless peripheral device 256, second wireless peripheral device 278, or any other to-be paired peripheral device may detect that the group ID pairing beacon is not being broadcasted within an initial time period.

For case of explanation, in an example embodiment where the first wireless peripheral device 256 may have been initiated prior to the second wireless peripheral device 278, the first wireless peripheral device 256, executing the computer-readable program code of the wireless pairing anti-collision module 264, determines that a group ID pairing beacon is not detected within an initial time period. This failure to detect the broadcast of the group ID pairing beacon is due to no other peripheral device, including the second wireless peripheral device 278, being initiated and capable of broadcasting the group ID pairing beacon within this initial time period.

In an embodiment, the first wireless peripheral device 256 may wait for the initial period of time to determine whether the group ID pairing beacon is detected or not prior to proceeding as described herein. In one example embodiment, the initial period of time may be 300 ms or less. In another embodiment, the initial period of time may be between 200 ms to 400 ms. In an embodiment, each of the wireless peripheral devices may include a pre-programed random delay that is added to this initial period and used to set a total initial period of time such that any two individual wireless peripheral devices will rarely have overlapping total initial periods despite being initiated at the same time. Any period of time set for the initial period of time is contemplated in the present specification. Where a group ID pairing beacon has been detected by the first wireless peripheral device 256 (e.g., detected by the first wireless peripheral device radio 272, first wireless peripheral device RF front end 274, and first wireless peripheral device antenna 276), the first peripheral device microcontroller 258 executing the wireless pairing anti-collision module 264 may then cause the first wireless peripheral device 256 to act as a subordinate peripheral device whose pairing to the information handling system 200 is controlled by the peripheral device who was broadcasting the group ID pairing beacon (e.g., now acting as the gateway peripheral device). However, where the first wireless peripheral device 256 does not detect a broadcasted group ID pairing beacon within the initial period of time, the first wireless peripheral device 256 acts as a gateway peripheral device used to control and manage the pairing of other peripheral devices such as the second wireless peripheral device 278 to the information handling system 200. In an embodiment, the first wireless peripheral device 256, now acting as the gateway wireless peripheral device, may broadcast the group ID pairing beacon so that all other competing wireless peripheral devices may detect the broadcast and assume the role of a subordinate peripheral device.

In an embodiment, the group ID pairing beacon includes data describing a common PD group ID 262 that is maintained on a first peripheral device storage device 260 and second peripheral device storage device 282 of a first wireless peripheral device 256 and second peripheral device storage device 282, respectively. In an embodiment, for all peripheral devices within a group of peripheral devices that are to be paired with the information handling system 200, this common PD group ID 262 may be stored on respective wireless peripheral device storage devices for later use during a pairing process. In an embodiment, each wireless peripheral device is capable of broadcasting this group ID pairing beacon with the common PD group ID 262 when acting as a gateway peripheral device but may not do so when these wireless peripheral devices have detected the broadcasted group ID pairing beacon.

In an embodiment, the first wireless peripheral device 256 and second wireless peripheral device 278 as well as any other number of peripheral devices may be associated with each other using this common PD group ID 262 when a user has purchased these peripheral devices. For example, an internet technology decision maker (ITDM) may purchase a new computer workspace for a new employee. This purchase may include the purchase of the information handling system 200 as well as any number of wireless peripheral devices including a wireless mouse (e.g., first wireless peripheral device 256), a wireless keyboard (e.g., second wireless peripheral device 278), a wireless video display device, a wireless stylus, among other wireless peripheral devices. Thus, although FIG. 2 shows a first wireless peripheral device 256 and a second wireless peripheral device 278, it is appreciated that the first wireless peripheral device 256 and second wireless peripheral device 278 may be any type of wireless peripheral device and that any number of wireless peripheral devices may be grouped together using the common PD group ID 262 at this initial purchase. In other scenarios, a user may complete a similar purchase via an online retail store that includes the information handling system 200 and plurality of wireless peripheral devices with each of the wireless peripheral devices maintaining a common PD group ID 262 on their respective peripheral device storage devices (e.g., first peripheral device storage device 260 and second peripheral device storage device 282). Because this common PD group ID 262 is common among all of the wireless peripheral devices to be wirelessly coupled to the information handling system 200, the broadcasting of the group ID pairing beacon by a gateway peripheral device will be recognized by each subsequent, competing wireless peripheral devices. It is also appreciated that the common PD group ID 262 may be user-specific such that any new wireless peripheral device purchased by or on behalf of the user may have this common PD group ID 262 stored on its respective peripheral device storage device so that this newly-purchased wireless peripheral device, acting as a subordinate wireless peripheral device, may be operatively and wirelessly coupled with the information handling system 200 pursuant to the systems and methods described herein.

Again, where the first wireless peripheral device 256 has not detected a broadcast of the group ID pairing beacon including the common PD group ID 262, the first wireless peripheral device 256 may act as the gateway peripheral device. Accordingly, the first wireless peripheral device 256, in this example embodiment, has become the initial peripheral device that is to act as the gateway peripheral device relative to other competing and subordinate peripheral devices such as the second wireless peripheral device 278. It is appreciated, therefore, that these wireless peripheral devices 256, 278, etc. are competing in a sense, such as based on timing of initiation or booting, to determine which of these devices are to act as the gateway peripheral device thereby relegating all other competing peripheral devices to the role of a subordinate peripheral device that is to be directed by the gateway peripheral device on when and how to pair with the information handling system 200.

In an embodiment, the first wireless peripheral device 256 may, after being determined to be the gateway peripheral device, begin to broadcast the group ID pairing beacon for subsequently-initiated wireless peripheral devices to detect and be directed to act as subordinate peripheral devices. This broadcast of the group ID pairing beacon informs the other competing peripheral devices to await for directions from the first wireless peripheral device 256 acting as the gateway peripheral device. In an embodiment, the first wireless peripheral device 256 acting as the gateway peripheral device may receive transmissions from each of the subordinate peripheral devices indicating to the first wireless peripheral device 256 that the other wireless peripheral devices are acting as subordinate peripheral devices and await further instructions from the first wireless peripheral device 256 to pair with the information handling system 200. In an embodiment, the first wireless peripheral device 256 may create a queue of subordinate peripheral devices such that each of the subordinate peripheral devices are systematically made to wait until it is that subordinate peripheral device's turn to pair with the information handling system 200.

In an embodiment, the first wireless peripheral device 256 acting as the gateway peripheral device may cause the group ID pairing beacon to be broadcasted using a generic attribute profile (GATT) transmission. This GATT transmission may initiate a communication with each of the subsequently-initiated peripheral devices including the second wireless peripheral device 278 to establish a gateway/subordinate relationship with each of the other peripheral devices and provide directions to wait for pairing instructions as described herein. The order of initiation or response to the group ID pairing beacon received at the first, gateway wireless peripheral device 256 may determine the queue order after the gateway first wireless peripheral device 256 in an example embodiment.

As the first wireless peripheral device 256 begins to, via execution of the wireless pairing anti-collision module 264 by the first peripheral device microcontroller 258, broadcast the group ID pairing beacon and establish these GATT communications with each of the other peripheral devices (e.g., the second wireless peripheral device 278), the first wireless peripheral device 256 will also initiate communications with the information handling system 200 in order to pair the first wireless peripheral device 256 with the information handling system 200. In an embodiment, the first wireless peripheral device 256 may initiate communication with the information handling system 200 using a GATT communication protocol. In an embodiment, the first wireless peripheral device 256 may broadcast the pairing request to the information handling system 200 that includes, among other data, the common PD group ID 262. The common PD group ID 262 identifies to the information handling system 200 that the first wireless peripheral device 256 is one of a group of wireless peripheral devices that may be operatively coupled to the information handling system 200.

In an embodiment, as the request to pair is received from the information handling system 200 and granted by the first wireless peripheral device 256, the information handling system 200 may request to discover available resources at the first wireless peripheral device 256. Again, the term "available resources" includes, at least, input and output capabilities of the first wireless peripheral device 256 (or any other pairing peripheral device) through which the user, via the first wireless peripheral device 256, may manipulate the first wireless peripheral device 256 to perform a gesture-based pairing operation. In an example embodiment, the first peripheral device microcontroller 258 of the first wireless peripheral device 256 may execute computer-readable program code of a peripheral device (PD) classifier 266 to provide the available resources at the first wireless peripheral device 256 to the information handling system 200. For example, where the first wireless peripheral device 256 is a wireless mouse, the input capabilities may include a left button, a right button, a scrolling wheel, and other buttons and input devices often associated with the wireless mouse, and which may be particular to the specific make, model, and type of wireless mouse. This wireless mouse does not, however, include output devices such as a display device. This makes the wireless mouse a headless peripheral device. Execution of the computer-readable program code of the peripheral device classifier 266 causes the first peripheral device microcontroller 258 to provide a listing of the available resources at the first wireless peripheral device 256 including these input and output capabilities (or lack thereof). As described herein, the user may later be requested, via a video display device 246 of the information handling system 200, to press any number of buttons, scroll the scrolling wheel, and/or move the mouse on a surface in any sequence to provide gesture authentication to the information handling system 200 for the first wireless peripheral device 256 to authenticate pairing with the information handling system 200. This process may be conducted for any type of wireless peripheral device that is acting as the gateway peripheral device to provide authentication to the information handling system 200 that the wireless peripheral device is authorized to pair with the information handling system 200 and may authorize it as the gateway peripheral device to the information handling system 200 for later pairing thereby adding a layer of security to this initial pairing process. Thus, a plurality of types of wireless input/output devices such as headless input/output devices may be paired with the information handling system 200 when they act as a gateway peripheral device as described herein. The wireless mouse, in the example above, is such a headless wireless peripheral device that does not have the capabilities to allow a user to input an authentication code or other pairing code via alphanumeric input.

In an embodiment, the first wireless peripheral device 256 may also transmit seed data to be used, concurrently, by both the hardware processor 202 of the information handling system 200 and the first peripheral device microcontroller 258 of the first wireless peripheral device 256 to generate a list of secure passcodes to be stored as the passcode list 294 on the first peripheral device storage device 260 of the first wireless peripheral device 256 and a data storage device of the information handling system 200. These generated secure passcodes within the passcode list 294 may be later used by the subordinate peripheral devices (e.g., second wireless peripheral device 278 in this example embodiment), at the direction of the first wireless peripheral device 256, to automatically pair the subordinate peripheral devices to the information handling system 200.

In an embodiment, one or more seed values may be generated by the first peripheral device microcontroller 258 using, for example, a random number generator (RNG) and sent to the information handling system 200 for generation of the list of secure passcodes of the passcode list 294. Again, the first seed value and second seed value may be transmitted to the information handling system 200 via a secure GATT communication to prevent third-party entities from gaining access to this data.

In an embodiment, both the hardware processor 202 of the information handling system 200 and the first peripheral device microcontroller 258 of the first wireless peripheral device 256 may concurrently execute a hash loop algorithm 296 or function that generates this list of secure passcodes of the passcode list 294. In an embodiment, the first peripheral device storage device 260 and the second peripheral device storage device 282 may store the hash loop algorithm 296 therein with the information handling system 100 also storing a copy of the same hash loop algorithm as machine-readable code instructions, parameters, and profiles 214 and accessible by the hardware processor 102, for example.

In one embodiment, the hash loop algorithm 296 may include computer-readable program code stored on a data storage device and executed by the hardware processors (e.g., hardware processor 202 and first peripheral device microcontroller 258) that generates this list of secure passcodes of the passcode list 294. In an embodiment, these passcodes of the passcode list 294 are based on a time elapsed since a reference time was defined by the first peripheral device microcontroller 258 and provided to the information handling system 200. In one embodiment, the hash loop algorithm 296 includes a time-based hash loop algorithm that runs a loop of advance encryption algorithms and a secure hash algorithm 256 (SHA256) hybrid algorithm to generate a series of passcodes of the passcode list 294 based on a processing time of each of the passcodes of the passcode list 294. In an embodiment, each of the information handling system 200, first wireless peripheral device 256, second wireless peripheral device 280, as well as any other pairable wireless peripheral device may include computer-readable program code instructions of the same hash loop algorithm 296 described herein such that each hardware device may generate this list of secure passcodes of the passcode list 294 independently. This done so that these hardware devices do not transmit any passcodes or passcode lists 294 via, for example, a BT or BLE communication thereby preventing a third-party from accessing these passcodes.

In an example embodiment, the hash loop algorithm 296 may concatenate a first seed value (e.g., generated by the RNG), a second seed value (e.g., generated by the RNG), and time stamp or timeblock tick generated by a timeblock, to generate the passcodes of the passcode lists 294 to be used by the information handling system 200 and any wireless peripheral device (e.g., 256, 278) to be paired with the information handling system 200. In an example embodiment, the timeblock (e.g., 498 described in FIG. 4 below) may provide a first key derived based on a current time reference. For example, where the data is Apr. 21, 2024 and the current time is 11 pm, timeblock at the information handling system 200 may generate a time stamp or time tick of 215799 (e.g., a hexadecimal value). By selecting a current time, the timeblock prevents any overlapping of time stamps or time ticks because old time stamps based on older dates and/or times will not be used because time keeps moving forward. In an embodiment, by providing this first key seed to a third input at a SHA256 module, a first output from the SHA256 module may be used at a first input at a first AES algorithm and a second output from the SHA265 module may be used as a second input at a second AES algorithm. Output from the first AES algorithm is used as a key value at the second AES algorithm while output from the second AES algorithm is used as a key value at the first AES algorithm. This constitutes an inner loop of the hashloop algorithm which is repeated each time the SHA256 module creates new first output and new second output as a result of time stamp or time tick from the timeblock. In an embodiment, because time will have elapsed since the first wireless peripheral device 256 had been paired with the information handling system 200, the use of the time stamp or time tick from the timeblock, a second time stamp or time tick is used by the hashloop algorithm 296 of the second wireless peripheral device 280 and a different passcode or list of passcodes of the passcode list 294 may be generated. In an embodiment, the information handling system 200 may control the time stamp or time tick used by each of the wireless peripheral devices 256, 278.

In an embodiment, the first AES output is used as a first input into a SHA256 algorithm, and the second AES output is used as a second input into that SHA256 algorithm. The outputs from the SHA256 module and the outputs from the first AES algorithm and the second AES algorithm may constitute a loop control that is used to control or moderate how the passcodes are to be moderated. In an embodiment, the first output value (output-L16) from the SHA256 algorithm may be used as a first input to a hash-based message authentication code (HMAC) while a second output (output-H16) is used as a second input to the HMAC in order to generate the list of secure passcodes of the passcode list 294. Because the timeblock is used, any number of passcodes of the passcode list 294 may be generated based on a time that has elapsed since the information handling system 200 had set a reference time and sent it to the first wireless peripheral device 256. In one embodiment, each of the hardware processor 202 of the information handling system 200 and the first peripheral device microcontroller 258 of the first wireless peripheral device 256 may generate the same list of secure passcodes of the passcode list 294 and maintain that list of secure passcodes of the passcode list 294 generated on a data storage device (e.g., the first peripheral device storage device 260) to be used later to automatically pair each of the other or subordinate wireless peripheral devices (e.g., second wireless peripheral device 278) to the information handling system 200. In an embodiment, the first peripheral device microcontroller 258 of the first wireless peripheral device 256 may cause that the first seed value, second seed value, and time stamp be transmitted to the individual subordinate peripheral devices to be paired with the information handling system 200. This allows each of the subordinate peripheral devices to generate the same list of secure passwords at their respective peripheral device microcontrollers for preparation to be automatically paired with the information handling system 200 when directed or coordinated by the first peripheral device microcontroller 258 of the first wireless peripheral device 256.

After confirming that the list of secure passcodes of the first peripheral device storage device 260 has been generated, the hardware processor 202 of the information handling system 200 may request that the gesture be performed by the user at the first wireless peripheral device 256 in order to authenticate and accept pairing of the first wireless peripheral device 256 and gateway peripheral device to the information handling system 200 as described in embodiments herein. It is appreciated that any gesture may be requested by the information handling system 200 and may be a randomized listing of gestures requested to be performed by the user at the first wireless peripheral device 256.

In an embodiment, one of the passcodes of the passcode list 294 among the list of secure passcodes may be transmitted from the first wireless peripheral device 256 to the information handling system 200 in order to perform a secure pairing of the first wireless peripheral device 256 to the information handling system 200. The selected secure passcode may be time-dependent or may be random such that the information handling system 200 may be capable of validating that the first peripheral device microcontroller 258 had properly derived or generated the correct list of passcodes based on the first seed value, second seed value, and time stamp provide earlier. The transmission of at least one secure passcode from the passcode list 294 may securely pair the first wireless peripheral device 256 to the information handling system 200 with a minimum amount of user interaction.

After the first wireless peripheral device 256 has been paired with the information handling system 200, the first wireless peripheral device 256 acting as the gateway peripheral device may begin to coordinate with the other wireless peripheral devices such as the second wireless peripheral device 278 to begin to pair with the information handling system 200. This process may include notifying the second wireless peripheral device 278 of the pairing completion between the first wireless peripheral device 256 and the information handling system 200. Still further, the first wireless peripheral device 256 may include instructions to the second wireless peripheral device 278 to pair with the information handling system 200 while also informing other wireless peripheral devices to wait until the second wireless peripheral device 278 has been paired with the information handling system 200. Prior to or after the first wireless peripheral device 256 directs the second wireless peripheral device 278 to pair with the information handling system 200, the first wireless peripheral device 256 may send the first seed value, the second seed value, and the time stamp or other time reference for the second peripheral device microcontroller 280 to execute the hash loop algorithm 296 stored on the second peripheral device storage device 282. Because the second peripheral device microcontroller 280 is to generate the same list of secure passcodes of the passcode list 294 as those generated by the first peripheral device microcontroller 258 and hardware processor 202, the hash loop algorithm 296 may be the same as those used by the first peripheral device microcontroller 258 to generate this list of secure passcodes of the passcode list 294. As a result, the pairing process of the second wireless peripheral device 278 may be automatically completed after the second peripheral device microcontroller 280 has sent one of the secure passcodes within the passcode list 294 to the information handling system 200. Because the information handling system 200 has stored this list of secure passcodes of the passcode list 294 on a data storage device within the information handling system 200, the hardware processor 202 of the information handling system 200 may cross-reference the passcode received from the second wireless peripheral device 278 with that list of secure passcodes and either allow or deny pairing with the second wireless peripheral device 278. It is noted that, unlike the first wireless peripheral device 256, the user is not required to perform a predefined gesture at the second wireless peripheral device 278. This is because the second wireless peripheral device 278 has the use of the list of secure passcodes and the independent execution of the hash loop algorithm 296 used to derive or generate the list of secure passcodes via use of the first seed value, second seed value, and time stamp. Additionally, the transmission of the available services of each of the competing wireless peripheral devices (e.g., second wireless peripheral device 278) is not conducted because there exists no need to perform the predetermined gesture. Thus, if the second wireless peripheral device 278 is a headless wireless peripheral device or not, these extra steps are not required to be performed by the user thereby increasing the efficiency and speed at which the remaining subordinate peripheral devices are paired with the information handling system 200.

It is appreciated that the first seed value, second seed value, and time stamp may be transmitted, securely via a GATT communication, to any of the competing, subordinate peripheral devices (e.g., second wireless peripheral device 278) at any time and may occur prior to the first wireless peripheral device 256 informing the second wireless peripheral device 278 that the first wireless peripheral device 256 has been paired with the information handling system 200. The transmission of the first seed value, second seed value, and time stamp to the subordinate peripheral devices may be made before directing the second wireless peripheral device 278 to initiate the pairing process with the information handling system 200. In an embodiment, as the first wireless peripheral device 256 transmits the first seed value and second seed value to the information handling system 200, the first wireless peripheral device 256 may also transmit this data to the second wireless peripheral device 278 and any other subordinate wireless peripheral device.

It is appreciated that the processes associated with the first wireless peripheral device 256 coordinating the pairing of the second wireless peripheral device 278 to the information handling system 200 may be similarly repeated for every other wireless peripheral device within the group of wireless peripheral devices. The order of the queue of subordinate wireless peripheral devices may be established at the gateway first wireless peripheral device 256 based on an order in which each of the subordinate wireless peripheral devices respond to the group ID pairing beacon broadcasted by the first wireless peripheral device 256 in an embodiment. In another embodiment, the order of the queue of subordinate wireless peripheral devices may be established at the gateway first wireless peripheral device 256 based on a device ID associated with each of the other subordinate wireless peripheral devices with an alphabetical and/or numerical arrangement of the device IDs determining the arrangement of the subordinate wireless peripheral devices within the queue. In this way, the execution of the wireless pairing anti-collision modules 264 at the first wireless peripheral device 256, second wireless peripheral device 278, and other wireless peripheral devices may avoid wireless congestion during pairing with the information handling system 200. In an embodiment, the possession of the common PD group ID 262 by each wireless peripheral devices allows these wireless peripheral devices to be included within the group of wireless peripheral devices and may be used to identify each of the wireless peripheral devices as being part of that group that are allowed to be wirelessly paired with the information handling system 200. In an embodiment, the first wireless peripheral device 256 may request that the subordinate peripheral devices provide the common PD group ID 262 in order to identify that these wireless peripheral devices are allowed to be wirelessly coupled to the information handling system 200. This allows the first peripheral device microcontroller 258 of the first wireless peripheral device 256 to identify that these subordinate peripheral devices should be put within a pairing queue maintained and orchestrated by the first wireless peripheral device 256 acting as the gateway peripheral device.

The systems and methods described herein may increase the efficiency and speed at which a group of wireless peripheral devices are wirelessly and operatively coupled to the information handling system 200 in a collision-free manner. The efficiency and speed of this pairing process is facilitated by a first-initialized wireless peripheral device determining that no group ID pairing beacon is being broadcasted and causing that wireless peripheral device to assume the role of a gateway peripheral device that controls the pairing of any subordinate peripheral device with the information handling system. With the initial wireless peripheral devices assuming the role of the gateway peripheral device, pairing collisions are avoid due to this gateway peripheral device directing each of the subordinate peripheral devices when to initiate a pairing process with the information handling system 200. Still further, the efficiency and speed at which the group of wireless peripheral devices are coupled to the information handling system 200 is also facilitated via the generation of the passcode list that can allow each of the subordinate peripheral devices to use a passcode to securely pair with the information handling system 200 without requiring a predetermined gesture or manual entry or confirmation of a passcode to be performed at each individual subordinate peripheral device. The initial pairing process of the first wireless peripheral device 256 to the information handling system 200 does, however, include the user performing a predetermined gesture to securely pair the first wireless peripheral device 256, acting as the gateway peripheral device to the information handling system 200 adding another level of security as a trusted wireless peripheral device. Additionally, each of the first wireless peripheral device 256, second wireless peripheral device 278, other wireless peripheral devices (not shown) and information handling system 200 use a time-session lock secure hash loop algorithm that dynamically generates a unique series of passcodes that uniquely identifies each wireless peripheral device to be paired with the information handling system 200. This results in an anti-replay attack design and a non-static group series of passcodes in the passcode list 294.

Figure 3A:
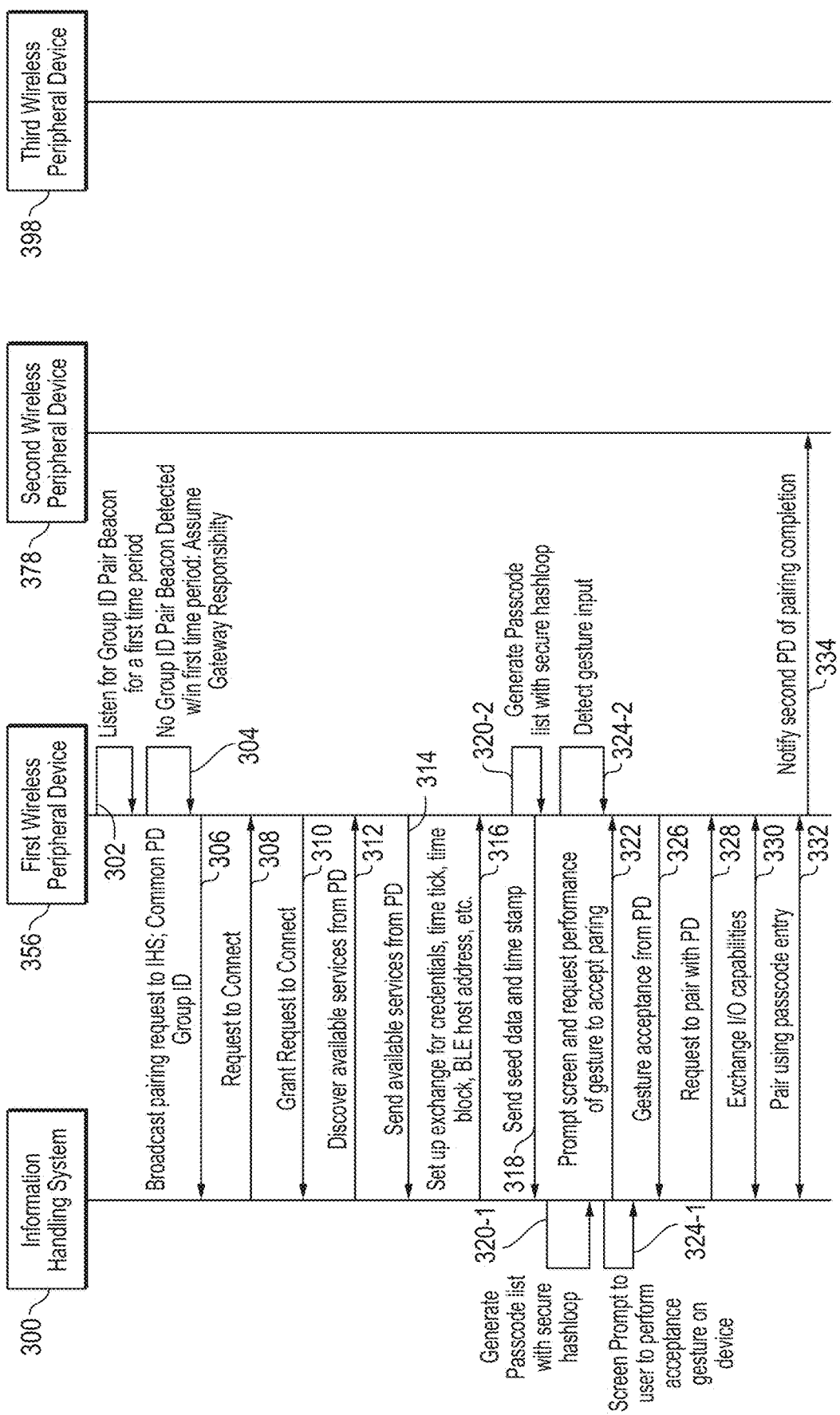
FIG. 3A is a flowchart showing a method of pairing a group of peripheral devices to an information handling system according to an embodiment of the present disclosure.
Figure 3B:
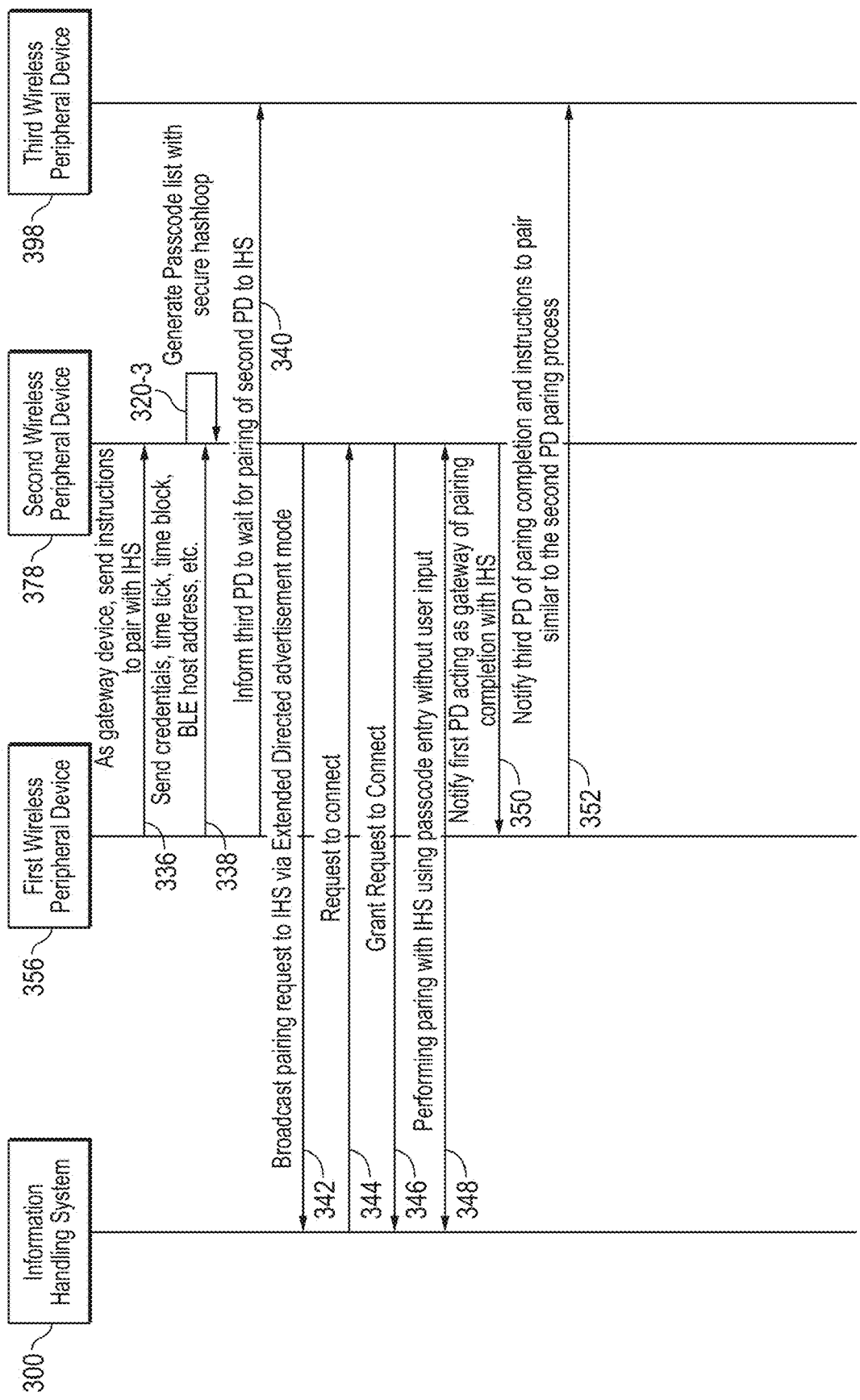
FIG. 3B is a continuation flowchart showing a method of pairing a group of peripheral devices to an information handling system according to an embodiment of the present disclosure.

FIG. 3A and FIG. 3B are swim lane flowcharts showing a method 301 of pairing a group of peripheral devices such as a first wireless peripheral device 356, second wireless peripheral device 378, and third wireless peripheral device 398 to an information handling system 300 according to an embodiment of the present disclosure. It is appreciated that, although FIG. 3A and FIG. 3B show a first wireless peripheral device 356, a second wireless peripheral device 378, and a third wireless peripheral device 398, the systems and methods described herein apply to pairing any number of wireless peripheral devices to the information handling system 300 which may be more or fewer than those shown and described in FIG. 3.

The method 301 may include, at line 302, with the first wireless peripheral device 356 "listening" or attempting to detect the group ID pairing beacon being broadcasted by any other wireless peripheral device (e.g., 378, 398) within the group of wireless peripheral devices. As described herein, this group ID pairing beacon includes data describing a common PD group ID that identifies each of the wireless peripheral devices (e.g., 356, 378, 398) as being a member of a group of wireless peripheral devices. This grouping of the first wireless peripheral device 356, second wireless peripheral device 378, and third wireless peripheral device 398 within a group of wireless peripheral devices may have been made during a purchasing process as described herein or may be associated with a user profile by a third-party such as an online purchasing website. For example, an internet technology decision maker (ITDM) may purchase a new computer workspace for a new employee. This purchase may include the purchase of the information handling system 200 as well as any number of wireless peripheral devices including a wireless mouse, a wireless keyboard, a wireless video display device, a wireless stylus, among other peripheral devices. In other scenarios, a user may complete a similar purchase via an online retail store that includes the information handling system 300 and plurality of wireless peripheral devices (e.g., FIG. 1, 156, 178, 146, 148, 150, 152, 154, etc.) with each of the wireless peripheral devices maintaining a common PD group ID on their respective peripheral device storage devices. Because this common PD group ID is common among all of the wireless peripheral devices to be wireless coupled to the information handling system 300, the broadcasting of the group ID pairing beacon by a gateway peripheral device will be recognized by each subsequent, competing wireless peripheral devices. It is also appreciated that the common PD group ID may be user-specific such that any new wireless peripheral device purchased by or on behalf of the user may have this common PD group ID stored on its respective peripheral device storage device so that this newly-purchased wireless peripheral device may be operatively and wirelessly coupled with the information handling system 300 pursuant to the systems and methods described herein.

In an embodiment at line 304, the first wireless peripheral device 356 may wait for an initial period of time to determine whether the group ID pairing beacon is detected or not prior to proceeding with the processes of the method 301. In an embodiment, the initial period of time may be 300 ms or less. In an embodiment, the initial period of time may be between 200 ms to 400 ms. Any period of time set for the initial period of time is contemplated in the present specification. Where a group ID pairing beacon has been detected by the first wireless peripheral device 356, the first peripheral device microcontroller executing computer-readable program code instructions the wireless pairing anti-collision module, for example in firmware, may then cause the first wireless peripheral device to act as a subordinate peripheral device whose pairing to the information handling system 300 is controlled by the peripheral device who was broadcasting the group ID pairing beacon (e.g., now acting as the gateway peripheral device). This scenario for the first wireless peripheral device 356 is not reflected in FIG. 3A and FIG. 3B, however, and instead it is the second wireless peripheral device 378 and third wireless peripheral device 398 that are relegated to being subordinate peripheral devices as shown in FIGS. 3A and 3B. This is because, at line 304, the first wireless peripheral device 356 does not detect the group ID pairing beacon and, therefore, assumes the role of a gateway peripheral device as described herein.

Indeed, where the first wireless peripheral device 356 does not detect a broadcasted group ID pairing beacon, the first wireless peripheral device 356 acts as a gateway peripheral device used to control and manage the pairing of other peripheral devices such as the second wireless peripheral device 378 and third wireless peripheral device 398 to the information handling system 300. In an embodiment, the first wireless peripheral device 356, now acting as the gateway wireless peripheral device, may broadcast the group ID pairing beacon so that all other competing wireless peripheral devices (e.g., 378, 398) may detect the broadcast and assume the role of a subordinate peripheral device.

At line 306, the first wireless peripheral device 356 may initiate a pairing process with the information handling system 300. This may include, in an embodiment, the transmission or broadcast of the request that includes the common PD group ID. In an embodiment, the first wireless peripheral device 356 may initiate communication with the information handling system 300 using a GATT communication protocol. At line 308, a request to pair is received from the information handling system 300 and granted, at line 310, by the first wireless peripheral device 356.

The method 301 further includes, at line 312, the information handling system 300 requesting to discover available resources at the first wireless peripheral device 156. Again, the term "available resources" includes input and output capabilities of the first wireless peripheral device 356 (or any other pairing peripheral device) through which the user, via the first wireless peripheral device 356, may manipulate the first wireless peripheral device 356 to perform a gesture-based pairing operation. In an example embodiment, the first peripheral device microcontroller of the first wireless peripheral device 356 may execute computer-readable program code of a PD classifier to provide the available resources at the first wireless peripheral device 356 to the information handling system 300 at line 314. For example, where the first wireless peripheral device 356 is a wireless mouse, the input capabilities may include a left button, a right button, a scrolling wheel, and other buttons and input devices often associated with the wireless mouse, and which may be particular to the specific make, model, and type of wireless mouse. This wireless mouse does not, however, include output devices such as a display device. This makes the wireless mouse a headless peripheral device. Execution of the computer-readable program code of the peripheral device classifier causes the first peripheral device microcontroller to provide a listing of the available resources at the first wireless peripheral device including these input and output capabilities (or lack thereof) to the information handling system 300 at line 314. As described herein, the user may later be requested, via a video display device of the information handling system 300, to press any number of buttons, scroll the scrolling wheel, and/or move the mouse on a surface in any sequence to provide gesture authentication to the information handling system 300 for the first wireless peripheral device 356 to establish the first wireless peripheral device 356 as a gateway wireless peripheral device and authenticate pairing with the information handling system 300. It is appreciated that this process may be conducted for any type of wireless peripheral device that is acting as the gateway peripheral device to provide authentication to the information handling system 300 that the wireless peripheral device is authorized to pair with the information handling system 300 thereby adding a layer of security to this initial pairing process. Thus, a plurality of types of wireless input/output devices such as headless input/output devices may be paired with the information handling system 300 when they act as a gateway peripheral device as described herein. The wireless mouse, in the example above, is such a headless wireless peripheral device that does not have the capabilities to allow a user to input an authentication code or other pairing code via alphanumeric input.

At line 316, the information handling system 300 may send instructions to set up an exchange for credentials, time tick, time block, BLE host address, and other data. This causes the first wireless peripheral device 356 to reply by transmitting seed data and a time stamp as described herein. In an embodiment, one or more seed values may be generated by the first peripheral device microcontroller of the first wireless peripheral device 356 using, for example, a RNG and sent to the information handling system 300 for generation of the list of secure passcodes of the passcode list. Again, the first seed value, second seed value, and time stamp may be transmitted at line 318 to the information handling system 300 via a secure GATT communication to prevent third-party entities from gaining access to this data.

At lines 320-1 and 320-2 both the hardware processor of the information handling system 300 and the first peripheral device microcontroller of the first wireless peripheral device 356 may concurrently execute a hash loop algorithm or function that generates a list of secure passcodes of a passcode list. In an embodiment, the first peripheral device storage device may store the hash loop algorithm therein with the information handling system 300 also storing a copy of the same hash loop algorithm as machine-readable code instructions, parameters, and profiles and accessible by the hardware processor, for example.

In one embodiment, the hash loop algorithm may include computer-readable program code stored on a data storage device and executed by the hardware processors (e.g., hardware processor and first peripheral device microcontroller) that generates this list of secure passcodes of the passcode list. In an embodiment, these passcodes of the passcode list are based on a time elapsed since a reference time was defined by the first peripheral device microcontroller and provided to the information handling system 300 or a timeblock by the first wireless peripheral device 356. In one embodiment, the hash loop algorithm includes a time-based hash loop algorithm that runs a loop of advance encryption algorithms and a SHA256 hybrid algorithm to generate a series of passcodes of the passcode list based on a reference time of each of the passcodes of the passcode list.

In an example embodiment, the hash loop algorithm may concatenate a first seed value (e.g., generated by the RNG), a second seed value (e.g., generated by the RNG), and a time stamp generated by a timeblock (e.g., on the first wireless peripheral device 356), to generate, initially, a first key and a second key to be used as input into a first AES encryption algorithm and a second AES encryption algorithm, respectively. This generate a first AES output and a second AES output. The first AES output is used as a first input into a SHA256 algorithm, and the second AES output is used as a second input into that SHA256 algorithm. The first output value (e.g., output-L16) from the SHA256 algorithm may be used as a first input to a hash-based message authentication code (HMAC) while a second output (e.g., output-H16) is used as a second input to the HMAC in order to generate the list of secure passcodes of the passcode list. Because the timeblock is used, any number of passcodes of the passcode list may be generated based on a time that has elapsed since the first peripheral device microcontroller had set a reference time and sent it to the information handling system 300. The hash loop algorithm may generate any number of time-based passcodes based on such a timeblock for the passcode list in an embodiment. It is appreciated that, although a specific type of hash loop algorithm is described herein, the present specification contemplates that any type of algorithm may be used to securely create a common list of passcodes between the information handling system 300 and the wireless peripheral devices (e.g., 356, 378, 398).

In one embodiment, each of the hardware processor of the information handling system 300 and the first peripheral device microcontroller of the first wireless peripheral device 356 may generate the same list of secure passcodes of the passcode list and maintain that list of secure passcodes of the passcode list generated on a data storage device. This passcode list is to be used later to automatically pair each of the other or subordinate wireless peripheral devices (e.g., second wireless peripheral device 378 and third wireless peripheral device 398) to the information handling system 300. In an embodiment, the first peripheral device microcontroller of the first wireless peripheral device 356 may cause that the first seed value, second seed value, and time stamp be transmitted to the individual subordinate peripheral devices that are to be paired with the information handling system 300. This allows each of the subordinate peripheral devices to generate the same list of secure passwords at their respective peripheral device microcontrollers using the same hash loop algorithm 396 for preparation to be automatically paired with the information handling system 300 when directed or coordinated by the first peripheral device microcontroller of the first wireless peripheral device 356.

After confirming that the list of secure passcodes of the first peripheral device storage device has been generated, the hardware processor of the information handling system 300 may, at line 322 generate a prompt screen at a display of the information handling system 300 at 324-1 and request that the gesture be performed by the user at the first wireless peripheral device 356 in order to authenticate and accept pairing of the first wireless peripheral device 356 to the information handling system 300. It is appreciated that any gesture may be requested by the information handling system 300 and may be a randomized listing of gestures requested to be performed by the user at the first wireless peripheral device 356 that can be performed on the first wireless peripheral device 356. Again, instructions to perform these gestures at the first wireless peripheral device 356 may be presented, at line 324-1, on a video display device of the information handling system 300 for the user to follow. At line 324-2, the user may perform the gest at the first wireless peripheral device 356 which generates gesture input data, such as HID data, at the first wireless peripheral device 356. At line 326, the user has engaged in the gesture-based actions at the first wireless peripheral device 356 to generate gesture input data, this is transmitted to and received at the information handling system indicating to the information handling system 300 that the pairing of the first wireless peripheral device 356 with the information handling system 300 should be accepted and indicating that the first wireless peripheral device 356 acts as the gateway wireless peripheral device.

At line 328, the information handling system 300 requests to pair with the first wireless peripheral device 356 and each of the devices exchange I/O capabilities at line 330. At line 332, one or more of the passcodes generated at lines 320-1 and 320-2 are exchanged over a secure GATT communication channel to confirm pairing between the first wireless peripheral device 356 and the information handling system 300 under the Bluetooth® or BLE standards. Thus, pairing of the first wireless peripheral device 356 with the information handling system 300 meets the highest level of security for pairing under the BLE standard since the pairing with the passcode entry processes described herein is classified as Mode 1, Level-4 highest pairing security level.

Having been paired with the information handling system 300, the first wireless peripheral device 356 may now inform the second wireless peripheral device 378 that the pairing between the first wireless peripheral device 356 and information handling system 300 is complete at line 334. In an embodiment, this notification includes, at line 336, instructing the first wireless peripheral device 356 to begin a pairing process with the information handling system 300. In an embodiment, the first wireless peripheral device 356 directs the second wireless peripheral device 378 to begin pairing with the information handling system 300 because the second wireless peripheral device 378 is listed as the next wireless peripheral device in the queue to be paired with the information handling system 300 established based on elapsed time of an order in which each of the subordinate wireless peripheral devices respond to the group ID pairing beacon broadcasted by the first wireless peripheral device 356 in an embodiment. In another embodiment, the order of the queue of subordinate wireless peripheral devices such as the second wireless peripheral device 378 may be established at the gateway first wireless peripheral device 356 based on initiation or boot order of the subordinate wireless peripheral devices, or based on a device ID associated with each of the other subordinate wireless peripheral devices with a priority of device types or an alphabetical and/or numerical arrangement of the device IDs determining the arrangement of the subordinate wireless peripheral devices within the queue. In this way, the execution of the computer-readable program code instructions wireless pairing anti-collision modules 364 at the first wireless peripheral device 356, second wireless peripheral device 378, and other wireless peripheral devices may avoid wireless congestion during pairing with the information handling system 300.

At line 338, the credentials, time tick, time block, BLE host address, and other data may be sent to the second wireless peripheral device 378 from the first wireless peripheral device 356. Concurrently, at line 340 the first wireless peripheral device 356 may notify the third wireless peripheral device 398 to wait for the pairing of the second wireless peripheral device 378 to the information handling system 300 before conducting a similar pairing process as well. Concurrently, at line 320-3, the second peripheral device microcontroller of the second wireless peripheral device 378 may execute the computer-readable program code of the hash loop algorithm described herein in order to generate the passcode list as described herein. Again, this passcode list includes the same passcodes generated and maintained by the first wireless peripheral device 356 and by the information handling system 300 at line 320-1 and allows the second wireless peripheral device 378 to be automatically paired with the information handling system 300 as described herein.

At line 342, the second wireless peripheral device 378 may initiate a pairing process with the information handling system 300. This may include, in an embodiment, the transmission or broadcast of the request that includes the common PD group ID. In an embodiment, the second wireless peripheral device 378 may initiate communication with the information handling system 300 using a GATT communication protocol. At line 344, a request to pair is received from the information handling system 300 and granted, at line 346, by the second wireless peripheral device 378. It is noted that, unlike the first wireless peripheral device 356, the user is not required to perform a predefined gesture at the second wireless peripheral device 378. This is because the second wireless peripheral device 378 has the use of the list of secure passcodes and the independent execution of the hash loop algorithm used to derive or generate the list of secure passcodes via use of the first seed value, second seed value, and time stamp. Additionally, the transmission of the available services of each of the competing wireless peripheral devices (e.g., second wireless peripheral device 378 and the third wireless peripheral device 392) is not conducted because there exists no need to perform the predetermined gesture. Thus, if the second wireless peripheral device 378 is a headless wireless peripheral device or not, these extra steps are not required to be performed by the user thereby increasing the efficiency and speed at which the remaining subordinate peripheral devices are paired with the information handling system 300. Thus, at line 348, the pairing process between the second wireless peripheral device 378 and the information handling system 300 is conducted via the use of the passcodes similar to that described at line 332 and according to passcode pairing under the BT or BLE standards.

Because the second wireless peripheral device 378 has a subordinate peripheral device role, it will notify, at line 350, the first wireless peripheral device 356 that the pairing process with the information handling system 300 has been completed so that the first wireless peripheral device 356 can automatically continue to execute its responsibilities as a gateway peripheral device without the information handling system 300. Indeed, at line 352, the first wireless peripheral device 356 executing the computer-readable program code of the wireless pairing anti-collision module, receives this pairing confirmation from the second wireless peripheral device 378 and instructs the third wireless peripheral device 398 to begin pairing with the information handling system 300 due to the second wireless peripheral device 378 being paired. It is appreciated that the pairing process between the third wireless peripheral device 398 and information handling system 300 may be similar to that of the second wireless peripheral device 378. The third wireless peripheral device 398 receives the first seed value, second seed value, and time stamp, executing the hash loop algorithm, and exchanging passcodes with the information handling system 300 as described in various embodiments herein. This process may be repeated for each of the other wireless peripheral devices within the group of wireless peripheral devices queued up to be paired with the information handling system 300. When all wireless peripheral devices have been paired with the information handling system 300, the method 301 may end here.

Figure 4:
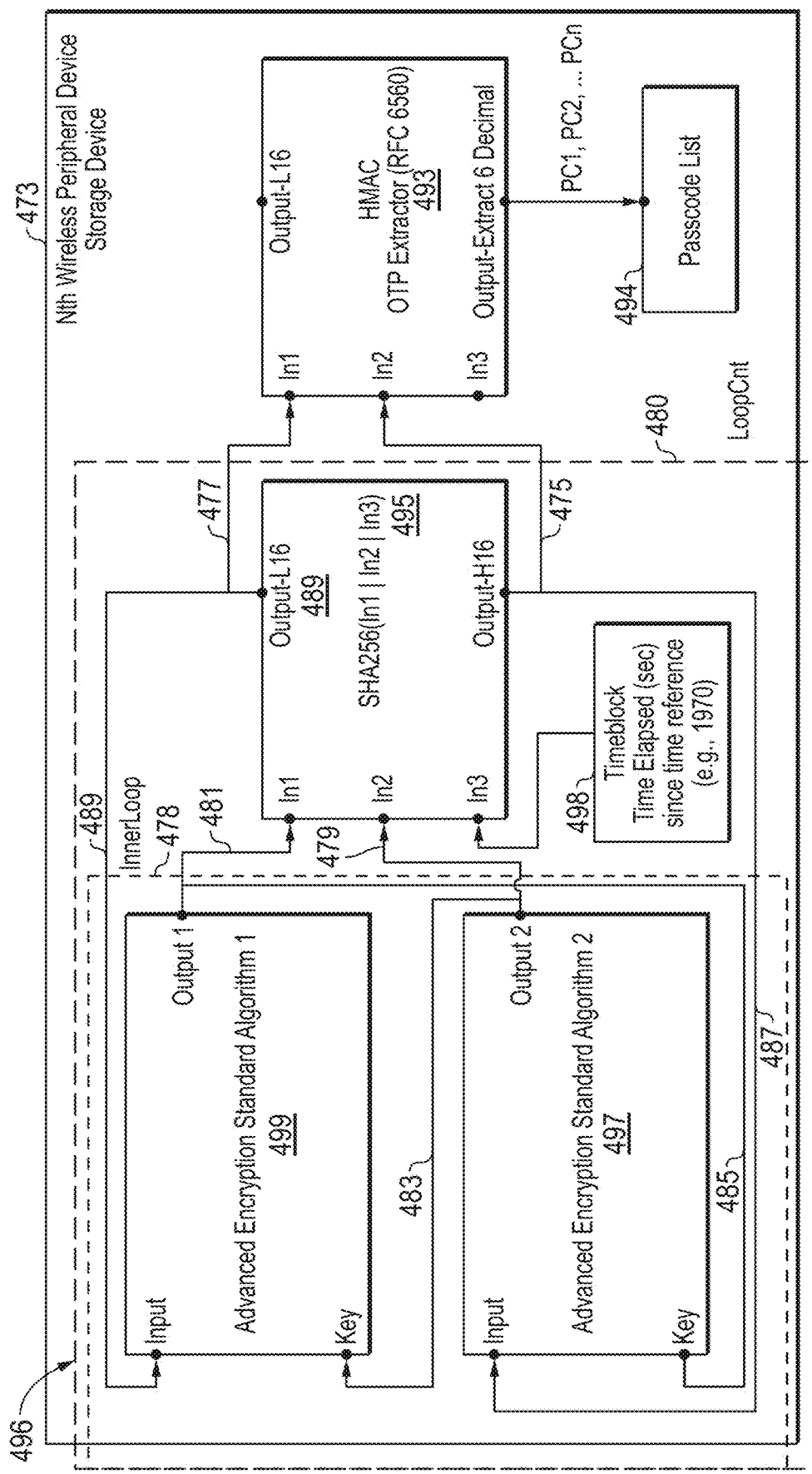
FIG. 4 is a block diagram illustrating a gateway peripheral device having a memory with a hash loop algorithm that is used to generate a series of passcodes between the gateway peripheral device and the information handling system according to an embodiment of the present disclosure.

FIG. 4 is a block diagram illustrating a microcontroller with memory storage for executing code instructions of a hash loop algorithm 496 that is used to generate a series of passcodes between a gateway peripheral device and the information handling system according to an embodiment of the present disclosure. It is appreciated that the hash loop algorithm 496 shown and described in FIG. 4 is merely one example algorithm that may be used to generate a list of passcodes and the present specification contemplates that other algorithms may be used to create a secure list of passcodes used to automatically pair wireless peripheral devices to the information handling system as described herein.

The hash loop algorithm 496 includes a timeblock 498, a first advanced encryption standard (AES) algorithm 499, a second AES algorithm 497, a SHA256 hybrid algorithm 495, and a hash-based message authentication code (HMAC) one time password (OTP) extractor algorithm 493. These algorithms and processes are used to create the passcode list 494 described herein.

In one embodiment, the hash loop algorithm 496 may include computer-readable program code stored on a data storage device and executed by the hardware processors (e.g., hardware processor or peripheral device microcontrollers) of the wireless peripheral devices that generates this list of secure passcodes of the passcode list 494. In an embodiment, these passcodes of the passcode list 494 are based on, in an embodiment, real time reference information such as the date and time at the time zone as defined by the information handling system 100 and provided to the first peripheral device microcontroller. In one embodiment, the hash loop algorithm 496 includes a time-based hash loop algorithm that runs a loop of advance encryption algorithms and a SHA256 hybrid algorithm 495 to generate a series of passcodes of the passcode list 494 based on a processing time of each of the passcodes of the passcode list 494.

In an example embodiment, the hash loop algorithm 496 may concatenate a first seed value (e.g., generated by the RNG), a second seed value (e.g., generated by the RNG), and time stamp or timeblock tick generated by a timeblock, to generate the passcodes of the passcode lists 194 to be used by the information handling system 100 and any wireless peripheral device (e.g., 156, 178) to be paired with the information handling system. The first seed value, second seed value and time stamp to timeblock tick may be passed from the timeblock 498 into a SHA third input line 491 of the SHA256 hybrid algorithm 495 to generate, initially, a first key via an ouptput-L16 489 and a second key via an output-H16 487 of the SHA256 hybrid algorithm 495 to be used as input into a first AES algorithm 499 and a second AES algorithm 497, respectively. Again, as described herein, the timeblock 498 may provide a first key or seed derived based on a current time reference. For example, where the data is Apr. 21, 2024 and the current time is 11 pm, the timeblock 498 (e.g., at the information handling system) may generate a time stamp or time tick of 215799 (e.g., a hexadecimal value). By selecting a current time, the timeblock 498 prevents any overlapping of time stamps or time ticks because old time stamps based on older dates and/or times will not be used because time keeps moving forward. Additionally, in an example embodiment, the first AES algorithm 499 and second AES algorithm 497 may be any substitution-permutation network that includes a fixed block size of 128 bits, and a key size of 128, 192, or 256 bits.

By passing the ouptput-L16 489 into the input at the first AES algorithm 499 and the output-H16 487 into the input at the second AES algorithm 497, a first key value 485 and second key value 483 are output from these AES algorithms 499, 497. When the first key value 485 and second key value 483 are used as key value inputs to the second AES algorithm 497 and first AES algorithm 499, respectively, this generate a first AES output 481 and a second AES output 479. The first AES output 481 is used as a first input into a SHA256 hybrid algorithm 495 and the second AES output 479 is used as a second input into that SHA256 hybrid algorithm 495. This interaction between the SHA256 module 495 and the first AES algorithm 499 and second AES algorithm 497 comprises an inner loop 478 of the hashloop algorithm which is repeated each time the SHA256 module creates new first output and new second output as a result of time stamp or time tick from the timeblock 498. In an embodiment, because time will have elapsed since the first wireless peripheral device had been paired with the information handling system, the use of the time stamp or time tick from the timeblock 498, a second time stamp or time tick is used by the hashloop algorithm 496 of the second wireless peripheral device and a different passcode or list of passcodes of the passcode list may be generated. In an embodiment, the information handling system may control the time stamp or time tick used by each of the wireless peripheral devices. By careful execution control of how many loops be executed before sending data to the final one-time password extractor algorithm (e.g., HMAC OTP extractor 493), this helps to improve the hash loop security.

With the first AES output 481 input used as the first input (In1) at the SHA256 hybrid algorithm 495, the second AES output 479 used as the second input (In2) at the SHA256 hybrid algorithm 495, and the time reference or time stamp value from the timeblock 498 as the third input (In3) of the SHA256 hybrid algorithm 495, a first concatenate output value 477 from the SHA256 hybrid algorithm 495 may be used as a first input to the HMAC OTP extractor algorithm 493 while a second concatenate output value 475 is used as a second input to the HMAC OTP extractor algorithm 493. As such, this part in an outerloop 480 loop control of the hashloop algorithm includes execution of the SHA256 hybrid algorithm 495 concatenates the first AES output 481, the second AES output 479, and the time stamp from the timeblock 498 to generate these first concatenate output value 477 and second concatenate output value 475 for added security.

In an embodiment, the execution of the HMAC OTP extractor algorithm 493 generates the list of secure passcodes of the passcode list 494 described herein. In an embodiment, the HMAC OTP extractor algorithm 493 provides a method of authentication by symmetric generation of human-readable passwords or values with each of the values being based on the time stamp generated by the timeblock 498. Because the timeblock 498 is used, any number of passcodes of the passcode list 494 may be generated based on a time that has elapsed since the first peripheral device microcontroller had set a reference time or time stamp to be sent it to the information handling system as described herein. The hash loop algorithm 496 may generate any number of time-based passcodes for the passcode list 494 at each wireless peripheral device in the queue as well as at the host information handling system in an embodiment. It is appreciated that, although a specific type of hash loop algorithm 496 is described herein, the present specification contemplates that any type of algorithm may be used to securely create a common list of passcodes between the information handling system and the wireless peripheral devices. In an embodiment, the passcode list 494 may be stored on any or any nth wireless peripheral device storage device 473 of each of the wireless peripheral devices that are to be paired with the information handling system.

Figure 5:
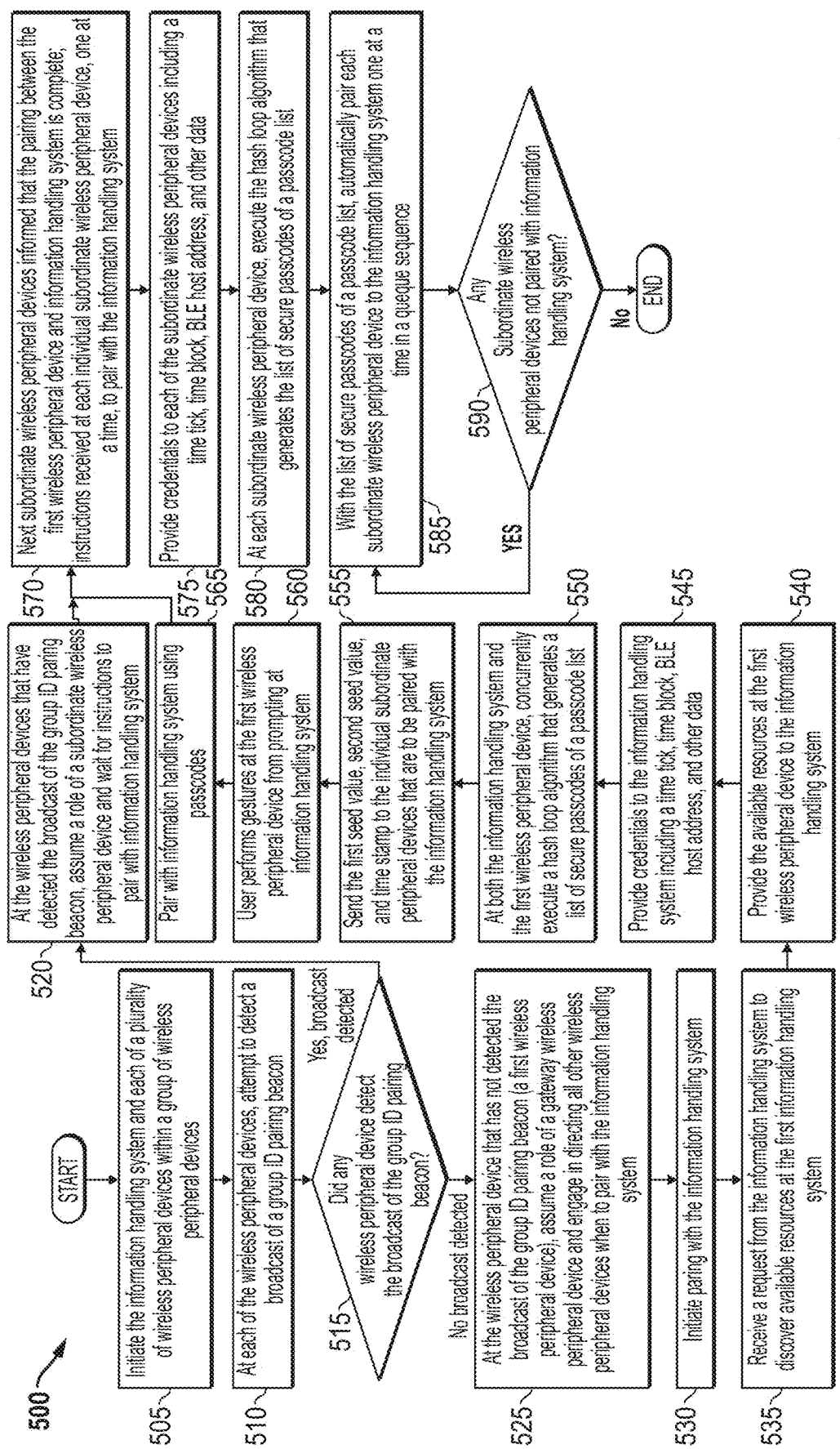
FIG. 5 is a flowchart showing a method of pairing a group of peripheral devices to an information handling system according to another embodiment of the present disclosure.

FIG. 5 is a flowchart showing a method 500 of pairing a group of wireless peripheral devices to an information handling system according to another embodiment of the present disclosure. As described herein, the method 500 may be used to securely operatively pair a plurality of wireless peripheral devices to an information handling system in a collision-free manner.

The method 500 may begin with the user initiating the information handling system and each of a plurality of wireless peripheral devices within a group of wireless peripheral devices at box 505. This initiation process may include the user activating a power button, switch, or other key that causes each of the wireless peripheral devices and information handling system to be powered on. In an embodiment, by initiating the wireless peripheral devices and the information handling system, power may be provided to a hardware processor of the information handling system and peripheral device microcontrollers of each wireless peripheral devices. By providing power to the peripheral device microcontrollers, the computer-readable program code of an wireless pairing anti-collision module may be executed by the peripheral device microcontrollers so that each wireless peripheral device may engage in the anti-collision processes described herein.

This anti-collision process includes, at block 510, attempting to detect a broadcast of a group ID pairing beacon at each of the wireless peripheral devices. It is appreciated that each of the wireless peripheral devices may be initiated concurrently such that each may begin to attempt to pair with the information handling system. In previous operations and methods of pairing wireless peripheral devices to an information handling system, this would result in pairing collisions between the individual wireless peripheral devices thereby increasing the duration of time to pair these wireless peripheral devices to the information handling system and may result in the inability of some wireless peripheral devices to not be paired with the information handling system.

To avoid a pairing collision between the wireless peripheral devices attempting to pair with the information handling system, the systems and methods described herein allow for an initial pairing peripheral device to act as a gateway device. In an embodiment, each of the wireless peripheral devices execute the computer-readable program code instructions of an wireless pairing anti-collision module to prevent these collisions. Execution of the computer-readable program code instructions of the wireless pairing anti-collision module causes each of the wireless peripheral devices to, independently, determine which of the wireless peripheral devices was the first peripheral device to broadcast the group ID pairing beacon. In an embodiment, there is independent execution of the wireless pairing anti-collision module by all of the wireless peripheral devices, when initiated, to attempt to detect a broadcast of this group ID pairing beacon at block 510.

It is appreciated, however, that each of the wireless peripheral devices may not be initiated at the exact same time, but only concurrently with one of the wireless peripheral devices being the first peripheral device, temporally, among this plurality of peripheral devices to be the first to attempt to detect a broadcast of the group ID pairing beacon. Thus, after an elapse of an initial time period only one of the wireless peripheral devices may detect that the group ID pairing beacon is not being broadcasted and will broadcast the group ID pairing beacon. For explanation purposes, in an example embodiment where a first wireless peripheral device of the wireless peripheral devices may have been initiated prior to all other wireless peripheral devices, the first wireless peripheral device, executing the computer-readable program code of the wireless pairing anti-collision module, determines that a group ID pairing beacon is not detected due to no other wireless peripheral device being initiated and capable of broadcasting the group ID pairing beacon before the initial time period at the first wireless peripheral device expires.

At block 515, each of the wireless peripheral devices may attempt to detect the broadcast of the group ID pairing beacon. Where any one of the wireless peripheral devices does detect the broadcast of the group ID pairing beacon indicating it was later-initiated than the first wireless peripheral device, the method 500, for those wireless peripheral devices, proceeds to block 520. At block 520, each of the wireless peripheral devices that detected the broadcasting of the group ID pairing beacon, these wireless peripheral devices may assume a role of a subordinate wireless peripheral device and wait for instructions to pair with the information handling system from a gateway wireless peripheral device. As described herein, there may be a plurality of wireless peripheral devices that detect the broadcast of the group ID pairing beacon, but only a single wireless peripheral device that does not detect the broadcast of the group ID pairing beacon. This is because there is only one wireless peripheral device that is initiated first and, because no other wireless peripheral device reaches expiration of the initial time period before it and, thus, no other competing wireless peripheral device has yet been able to broadcast the group ID pairing beacon. Accordingly, this first wireless peripheral device will be the only wireless peripheral device to not detect the broadcast as later-initiated, competing wireless peripheral devices will start the initial time period timer later and receive the broadcasted group ID pairing beacon from the first wireless peripheral device before their timers expire.

Therefore, at block 515, where a wireless peripheral device does not detect the broadcast of the group ID pairing beacon, the method 500, for that wireless peripheral device proceeds to block 525. At block 525, the method 500 includes the first or initial wireless peripheral device assuming the role of a gateway wireless peripheral device and engages in directing all other wireless peripheral devices regarding when to initiate a pairing process with the information handling system. In an embodiment, the first wireless peripheral device may wait for the initial period of time to pass to determine whether the group ID pairing beacon is detected or not prior to proceeding as described in block 525. In an embodiment, the initial period of time may be 300 ms or less. In an embodiment, the initial period of time may be between 200 ms to 400 ms or any initial time period. As described herein, each of the wireless peripheral devices includes a wireless peripheral device radio and antenna that allows for the transception of data including the broadcasting of the group ID pairing beacon such that each may make this independent determination at block 515 and assume those respective roles described in block 520 and 525. In an embodiment, the first wireless peripheral device at block 525, now acting as the gateway wireless peripheral device, may broadcast the group ID pairing beacon so that all other competing wireless peripheral devices may detect the broadcast and assume the role of the subordinate peripheral device as described at block 520. It is appreciated, therefore, that these wireless peripheral devices are competing to determine which of these devices are to act as the gateway peripheral device thereby rendering all other competing peripheral devices to the role of a subordinate peripheral device that is to be directed by the gateway peripheral device on when and how to pair with the information handling system.

At block 530, the first wireless peripheral device may initiate a pairing process with the information handling system. In an embodiment, the transmission or broadcast of the request from the first wireless peripheral device to the information handling system includes the data describing the common PD group ID. In an embodiment, the first wireless peripheral device may initiate communication with the information handling system using a GATT communication protocol to initiate pairing under the Bluetooth® or BLE protocols. In an embodiment, this request to pair is received from the information handling system and granted by the first wireless peripheral device.

At block 535, the method 500 includes the information handling system requesting to discover available resources at the first wireless peripheral device. Again, the term "available resources" includes input and output capabilities of the first wireless peripheral device through which the user, via the first wireless peripheral device, may manipulate the first wireless peripheral device to perform a gesture-based pairing operation during this method 500. In an example embodiment, the peripheral device microcontroller of the first wireless peripheral device may execute computer-readable program code of a PD classifier to provide the available resources at the first wireless peripheral device to the information handling system at block 540. For example, where the first wireless peripheral device is a wireless mouse, the input capabilities may include a left button, a right button, a scrolling wheel, and other buttons and input devices often associated with the wireless mouse, and which may be particular to the specific make, model, and type of wireless mouse. This wireless mouse does not, however, include output devices such as a display device. This makes the wireless mouse a headless peripheral device. Execution of the computer-readable program code of the peripheral device classifier causes the first peripheral device microcontroller to provide a listing of the available resources at the first wireless peripheral device including these input and output capabilities (or lack thereof) to the information handling system.

At block 545, the first wireless peripheral device may provide credentials to the information handling system with the information handling system providing other information to the first wireless peripheral device including a time tick, time block, and other data. This may include the transmission of seed data and a time stamp as described herein. In an embodiment, a first seed value and second seed value may be generated by the first peripheral device microcontroller of the first wireless peripheral device using, for example, an RNG. These first and second seed values are saved by the first wireless peripheral device for later use when coordinating with the subordinate wireless peripheral devices to pair with the information handling system.

With these seed values and a time stamp from the timeblock, both the information handling system and the first wireless peripheral device may concurrently execute a hash loop algorithm or function that generates a list of secure passcodes of a passcode list at block 550. In one embodiment, the hash loop algorithm may include computer-readable program code stored on a data storage device and executed by the hardware processors (e.g., hardware processor and first peripheral device microcontroller) that generates this list of secure passcodes of the passcode list. In an embodiment, these passcodes of the passcode list are based on a time elapsed since a reference time was defined by the first peripheral device microcontroller and provided to the information handling system by the first wireless peripheral device. In one embodiment, the hash loop algorithm includes a time-based hash loop algorithm that runs a loop of advance encryption algorithms and a SHA256 hybrid algorithm to generate a series of passcodes of the passcode list based on a processing time of each of the passcodes of the passcode list.

In an example embodiment, the hash loop algorithm may concatenate a first seed value (e.g., generated by the RNG), a second seed value (e.g., generated by the RNG), and a time stamp generated by a timeblock (e.g., on the first wireless peripheral device), to generate, initially, a first key and a second key to be used as input into a first AES encryption algorithm and a second AES encryption algorithm, respectively. This generate a first AES output and a second AES output. The first AES output is used as a first input into a SHA256 algorithm, and the second AES output is used as a second input into that SHA256 algorithm. The first output value (e.g., output-L16) from the SHA256 algorithm may be used as a first input to a hash-based message authentication code (HMAC) while a second output (e.g., output-H16) is used as a second input to the HMAC in order to generate the list of secure passcodes of the passcode list. Because the timeblock is used, any number of passcodes of the passcode list may be generated based on a time that has elapsed since the first peripheral device microcontroller had set a reference time and sent it to the information handling system. The hash loop algorithm may generate any number of time-based passcodes for the passcode list in an embodiment. It is appreciated that, although a specific type of hash loop algorithm is described herein, the present specification contemplates that any type of algorithm may be used to securely create a common list of passcodes between the information handling system and the gateway peripheral device and subordinate wireless peripheral devices.

In one embodiment, each of the hardware processor of the information handling system and the first peripheral device microcontroller of the first wireless peripheral device may generate the same list of secure passcodes of the passcode list and maintain that list of secure passcodes of the passcode list generated on a data storage device. This passcode list is to be used later to automatically pair each of the other or subordinate wireless peripheral to the information handling system.

In an embodiment, at block 555, the first peripheral device microcontroller of the first wireless peripheral device may cause that a passcode indirect index or hint be transmitted to the individual subordinate peripheral devices that are to be paired with the information handling system. These a passcode indirect indexes or hints allows each of the subordinate peripheral devices to generate the same list of secure passwords at their respective peripheral device microcontrollers using the same hash loop algorithm for preparation to be automatically paired with the information handling system when directed or coordinated by the first peripheral device microcontroller of the first wireless peripheral device.

At block 560, the user performs the gestures at the first wireless peripheral device that are prompted via a display device of the host information handling system. The host information handling system, having received the available resources of the gateway wireless peripheral device, selects displays instructions or images to prompt an authenticating gesture with the gateway wireless peripheral device based on the device type classification of the first wireless peripheral device and the identified available resources. Again, this is done so as to authenticate and accept pairing of the first wireless peripheral device to the information handling system. It is appreciated that any gesture to be performed by the user at the first wireless peripheral device may be requested by the information handling system and may be a randomized listing of gestures requested to be performed by the user at the first wireless peripheral device that can be performed on the first wireless peripheral device. Again, instructions to perform these gestures at the first wireless peripheral device may be presented on a video display device of the information handling system for the user to follow. When the user has engaged in the gesture-based actions at the first wireless peripheral device, to generate mutually interpretable encoded and encrypted data, this input data is transmitted to the information handling system indicating to the information handling system that the pairing of the first wireless peripheral device with the information handling system should be accepted and that the first wireless peripheral device may act as a gateway wireless peripheral device.

At block 565, the method 500 includes pairing the first wireless peripheral device to the information handling system using the passcodes generated independently by the information handling system and first wireless peripheral device. At this point, one or more of the indexes or hints are exchanged over a secure GATT communication channel to confirm pairing between the first wireless peripheral device and the information handling system.

At block 570, the method 500 includes the first wireless peripheral device informing the subordinate wireless peripheral devices that the pairing between the first wireless peripheral device and information handling system is complete and instructing each individual subordinate wireless peripheral device, one at a time in a queue order, to pair with the information handling system. As described herein, the order of the queue of subordinate wireless peripheral devices may be established at the gateway first wireless peripheral device based on an order in which each of the subordinate wireless peripheral devices respond to the group ID pairing beacon broadcasted by the first wireless peripheral device in an embodiment. In another embodiment, the order of the queue of subordinate wireless peripheral devices may be established at the gateway first wireless peripheral device based on an initiation or boot up order of the competing wireless peripheral devices or based on a priority of device types and a device ID associated with each of the other subordinate wireless peripheral devices. Further, an alphabetical and/or numerical arrangement of the device IDs may be used to determine the arrangement of the subordinate wireless peripheral devices within the queue. Any criteria is contemplated so long as the queue order is established among the subordinate wireless peripheral devices for pairing and collisions can be avoided in pairing. In this way, the execution of the wireless pairing anti-collision modules at the first wireless peripheral device, second wireless peripheral device, and other wireless peripheral devices may avoid wireless congestion during pairing with the information handling system. At block 575, the first wireless peripheral device provides the credentials, first seed value, second seed value, time tick, time block, BLE host address, and other data may be sent to each of the subordinate wireless peripheral devices according to embodiments herein. This is done in order to, at block 580, generate the passcode list described in block 550. Again, this includes the microcontrollers of each of the subordinate wireless peripheral devices executing computer-readable program code of the same hash loop algorithm.

Thus, at block 585, each of the subordinate wireless peripheral devices may use the list of secure passcodes of the passcode list to automatically pair each of the subordinate wireless peripheral devices in a queued sequence to the information handling system when it is their turn to proceed as directed by the gateway peripheral device (e.g., the first wireless peripheral device). One at a time, each of the subordinate wireless peripheral devices may initiate the pairing process with the information handling system and complete the pairing process by exchanging passcodes to verify authorization to pair with the information handling system. In an embodiment, after each of the subordinate wireless peripheral devices have reported to the first wireless peripheral device that the pairing with the information handling system is completed, the first wireless peripheral device may so inform the next subordinate wireless peripheral devices in the queue of subordinate wireless peripheral devices to proceed with the pairing process.

At block 590, the first wireless peripheral device may determine whether any of the subordinate wireless peripheral devices are not paired with the information handling system. Where there are additional subordinate wireless peripheral devices to be paired with the information handling system, the method 500 returns to block 585 as described herein. Where no other subordinate wireless peripheral devices still needs to be paired with the information handling system at block 590 the method 500 may end here.

The blocks of the flow diagrams of FIGS. 3A, 3B, 4, and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A peripheral device operatively couplable to an information handling system comprising:
a peripheral device hardware microcontroller;
a peripheral device storage device;

a peripheral device wireless radio; and a peripheral device power management unit (PMU) to provide power to the peripheral device hardware microcontroller, peripheral device storage device, and peripheral device wireless radio;

the peripheral device hardware microcontroller to execute computer-readable program code of a wireless pairing anti-collision module stored on the peripheral device storage device to determine that a group identification (ID) pairing beacon from one of a plurality of competing wireless peripheral devices attempting to pair is not being broadcasted;

when no group ID pairing beacon is detected, the peripheral device hardware microcontroller initiates a pairing process with the information handling system and generates a passcode list via execution of a hash loop algorithm;

the peripheral device hardware microcontroller to transmit, via the wireless peripheral device radio, to each of the plurality of competing pairing peripheral devices the group ID pairing beacon that indicates that the peripheral device is operating as a gateway peripheral device that controls the timing of the pairing of each of the plurality of competing pairing peripheral devices to the information handling system; and the peripheral device hardware microcontroller executing computer-readable program code of a peripheral device (PD) classifier to provide, to the information handling system, a listing of available services at the peripheral device that define how a user may interact with the peripheral device to perform a predefined gesture at the peripheral device to accept pairing of the peripheral device to the information handling system when the peripheral device is operating as the gateway peripheral device.

2. The peripheral device of claim 1, wherein the group ID pairing beacon includes a broadcast of a common peripheral device group ID that is used to associate each of the peripheral device and competing pairing peripheral devices with each other.

3. The peripheral device of claim 1, wherein the predefined gesture required to pair the peripheral device to the information handling system is dependent on an identification of a type of the peripheral device as associated with the listing of available services indicating input capabilities of the peripheral device.

4. The peripheral device of claim 1, further comprising:
the peripheral device hardware microcontroller executing computer readable code instructions of the hash loop algorithm including a time-based hash loop algorithm that runs a loop of advance encryption algorithms and a SHA256 hybrid algorithm to generate a series of passcodes for pairing based on a reference time generated at a timeblock at the peripheral device for of each of the passcodes.

5. The peripheral device of claim 4, wherein a current time reference is input into the time-based hash loop algorithm to generate the series of passcodes wherein the first seed input and second seed input are generated using a number generator.

6. The peripheral device of claim 5, further comprising:
the peripheral device hardware microcontroller to provide the information handling system, prior to pairing with the information handling system, a passcode indirect index for a hardware processor of the information handling system to execute the time-based hash loop algorithm to generate a matching series of passcodes as the peripheral device hardware microcontroller of the peripheral device.

7. The peripheral device of claim 1, further comprising:
the peripheral device hardware microcontroller to arrange the pairing order of each of the competing pairing peripheral devices in a queue based on an order in which each of the plurality of the competing wireless peripheral devices respond to the group ID pairing beacon broadcasted by the peripheral device and transmit a notification to each competing pairing peripheral device when the peripheral device hardware microcontroller has received a communication that a previous competing pairing peripheral device has been paired with the information handling system.

8. A method of pairing a group of peripheral devices to an information handling system, comprising:
executing computer-readable program code of a wireless pairing anti-collision module with a peripheral device hardware microcontroller of a first peripheral device to determine that a group identification (ID) pairing beacon from one of a plurality of competing pairing peripheral devices has not been received at a wireless adapter after an initial time period elapses and engage with the information handling system and competing pairing peripheral devices as a gateway peripheral device to conduct pairing of each of the first peripheral device and competing pairing peripheral devices with the information handling system;

transmitting a first broadcast to the information handling system to operatively pair the first peripheral device acting as the gateway peripheral device to the information handling system and generating a passcode list via execution of a hash loop algorithm between the first peripheral device and the information handling system;

transmitting a second broadcast to be received by each of the competing pairing peripheral devices indicating to wait for pairing with the information handling system until an order in which each of the competing pairing peripheral devices are to initiate a pairing process with the information handling system has been reached for each competing pairing peripheral device; and executing computer-readable program code of a peripheral device (PD) classifier with the peripheral device hardware microcontroller of the first peripheral device to provide, to the information handling system, a listing of available services at the first peripheral device that define how a user may interact with the first peripheral device to perform a predefined gesture at the first peripheral device to accept pairing of the first peripheral device to the information handling system when the first peripheral device operates as the gateway peripheral device.

9. The method of claim 8, wherein the group ID pairing beacon includes data describing a common peripheral device group ID that is used to associate each of the peripheral device and competing pairing peripheral devices with each other.

10. The method of claim 8, wherein the predefined gesture required to pair the peripheral device to the information handling system is dependent on an identification of the type of the peripheral device including input capabilities of the peripheral device listing of available services.

11. The method of claim 8, further comprising:
executing computer readable program code instructions of the hash loop algorithm including a time-based hash loop algorithm that runs a loop of advance encryption algorithms and a SHA256 hybrid algorithm to generate a series of passcodes for pairing based on a reference time generated at a timeblock for each of the passcodes.

12. The method of claim 11, wherein a current time reference is input are input into the time-based hash loop algorithm to generate the series of passcodes wherein the first seed input and second seed input are generated using a number generator.

13. The method of claim 8, further comprising:
executing computer-readable program code of a wireless pairing anti-collision module with a peripheral device hardware microcontroller of a first peripheral device to determine that the group ID pairing beacon from one of a plurality of competing pairing peripheral devices has been received from a competing wireless peripheral device at a wireless adapter prior to the initial time period elapsing and transmit to the competing wireless peripheral device a response to be placed within a queue to be directed when to pair with the information handling system.

14. The method of claim 8, further comprising:
arranging the pairing order of each of the competing pairing peripheral devices in a queue based on timing of a response to a transmission of the group ID pairing beacon from the competing pairing peripheral devices being received at the gateway peripheral device and transmitting a notification to each of the competing pairing peripheral devices when the peripheral device hardware microcontroller of the first peripheral device has received a communication that a previous competing pairing peripheral device has been paired with the information handling system.

15. A first peripheral device among a group of peripheral devices operatively couplable to an information handling system comprising:
a peripheral device hardware microcontroller;
a peripheral device storage device;
a peripheral device wireless radio;
the peripheral device hardware microcontroller executing computer-readable program code of a wireless pairing anti-collision module stored on the peripheral device storage device to determine that a group identification (ID) pairing beacon from one of a plurality of competing pairing peripheral devices has not been received at a peripheral device wireless radio within an elapsed initial period of time since initiation of the peripheral device;
when no group ID pairing beacon is detected, the peripheral device hardware microcontroller to initiate a pairing processes with the information handling system and generating a passcode list via execution of computer-readable program code instructions of a hash loop algorithm;
transmit to each of the plurality of competing pairing peripheral devices an indication that the first peripheral device is operating as a gateway peripheral device that controls the timing of the pairing of each of the plurality of competing pairing peripheral devices to the information handling system; and
the peripheral device hardware microcontroller executing computer-readable program code of a peripheral device (PD) classifier to provide, to the information handling system, a listing of available services at the first peripheral device that define how a user may interact with the first peripheral device to perform a predefined gesture prompted at the information handling system for the first peripheral device to accept pairing of the first peripheral device to the information handling system when the first peripheral device operates as the gateway peripheral device.

16. The first peripheral device of claim 15, wherein the group ID pairing beacon includes a broadcast of a common peripheral device group ID that is used to associate each of the peripheral device and competing pairing peripheral devices with each other.

17. The first peripheral device of claim 15, further comprising: the peripheral device hardware microcontroller executing computer-readable program code of the wireless pairing anti-collision module with the peripheral device hardware microcontroller of the first peripheral device to determine that the group ID pairing beacon from one of the plurality of competing pairing peripheral devices has been received at the wireless adapter prior to elapsing of the initial time period; and the peripheral device wireless radio transmitting to the competing wireless peripheral device that transmitted the group ID pairing beacon a response to be placed within a queue to be directed when to pair with the information handling system.

18. The first peripheral device of claim 15, further comprising: the peripheral device hardware microcontroller executing the computer-readable program code instructions of the hash loop algorithm including a time-based hash loop algorithm that runs a loop of advance encryption algorithms and a SHA256 hybrid algorithm to generate a series of passcodes based on a reference time generated at a timeblock, wherein a first seed input and a second seed input are input into the time-based hash loop algorithm to generate the series of passcodes for pairing wherein the first seed input and second seed input are generated using a number generator.

* * * * *